US012559067B2

(12) United States Patent
 Nishimura

(10) Patent No.: US 12,559,067 B2
(45) Date of Patent: Feb. 24, 2026

(54) PEDAL DEVICE

(71) Applicant: DENSO CORPORATION, Kariya (JP)

(72) Inventor: Atsushi Nishimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 19 days.

(21) Appl. No.: 18/663,853

(22) Filed: May 14, 2024

(65) Prior Publication Data

US 2024/0294147 A1     Sep. 5, 2024

Related U.S. Application Data

(63) Continuation of application No. PCT/JP2022/039930, filed on Oct. 26, 2022.

(30) Foreign Application Priority Data

Nov. 17, 2021    (JP) ................................. 2021-187079

(51) Int. Cl.
 *B60T 7/04*        (2006.01)
 *G05G 5/03*        (2008.04)
 *G05G 5/05*        (2006.01)

(52) U.S. Cl.
 CPC ............... *B60T 7/042* (2013.01); *G05G 5/03* (2013.01); *G05G 5/05* (2013.01); *G05G 2505/00* (2013.01)

(58) Field of Classification Search
 None
 See application file for complete search history.

(56) References Cited

U.S. PATENT DOCUMENTS

| | | | |
|---|---|---|---|
| 2006/0053957 A1* | 3/2006 | Ewel ....................... | F02D 11/02 74/560 |
| 2017/0334416 A1* | 11/2017 | Ryu ....................... | B60T 8/4081 |
| 2022/0348172 A1 | 11/2022 | Yanagida et al. | |

FOREIGN PATENT DOCUMENTS

JP        2001239925 A        9/2001

* cited by examiner

*Primary Examiner* — Vicky A Johnson
(74) *Attorney, Agent, or Firm* — Nixon & Vanderhye P.C.

(57) ABSTRACT

In a pedal device, a pedal is attached to a housing, and a reaction force generating unit is configured to apply a reaction force to the pedal against a load given by a braking operation due to elastic deformation when the posture of the pedal changes from a reference position in a first direction by the braking operation, and to restore a position of the pedal to the reference position by the reaction force when the braking operation is released. A pedal restoring unit is provided in parallel with the reaction force generating unit, and configured to be elastically deformed according to a change amount in the posture of the pedal, and to apply a restoring force to the pedal to bring the position of the pedal closer to the reference position by changing the posture of the pedal in the second direction when the braking operation is released.

17 Claims, 13 Drawing Sheets

322 161 117 11

72 160 Dy1 Dy

Dy2

161c 161e 70

161a 161b 30, 32

161f 321

161d

73

Dz

71 CL 30, 31

12

UP
Db

FRONT → REAR
Dc, Dx
Da DOWN

RESTORING FORCE,
REACTION FORCE

REACTION
FORCE

RESTORING
FORCE

PEDAL OWN WEIGHT

REFERENCE θ ROTATION
POSITION ANGLE

UP

Db

FRONT ←→ REAR

Dc, Dx

Da    DOWN

RESTORING FORCE

PEDAL OWN WEIGHT

REFERENCE    θ    ROTATION
POSITION    ANGLE

PEDAL DEVICE

CROSS REFERENCE TO RELATED APPLICATION

The present application is a continuation application of International Patent Application No. PCT/JP2022/039930 filed on Oct. 26, 2022, which designated the U.S. and claims the benefit of priority from Japanese Patent Application No. 2021-187079 filed on Nov. 17, 2021. The entire disclosures of all of the above applications are incorporated herein by reference.

TECHNICAL FIELD

The present disclosure relates to a pedal device.

BACKGROUND

Conventionally, a brake device for a vehicle is known, which includes (i) a brake pedal having an arm that rotates about a rotation axis and a pedal that is stepped by a driver, and (ii) a spring mechanism including a stranded wire spring that is compressively deformed when the pedal is stepped.

SUMMARY

According to an aspect of the present disclosure, a pedal device includes a housing, a pedal, a reaction force generating unit and a pedal restoring unit. The pedal is attached to the housing in a posture changeable from a reference position in a first direction by a braking operation of a driver, and changeable in a second direction opposite to the first direction when the braking operation is released. The reaction force generating unit is configured to apply a reaction force to the pedal against a load given by the braking operation due to elastic deformation when the posture of the pedal changes from the reference position in the first direction by the braking operation, and to restore a position of the pedal to the reference position by the reaction force when the braking operation is released. In addition, the pedal restoring unit is provided in parallel with the reaction force generating unit, and is configured to be elastically deformed according to a change amount in the posture of the pedal and to apply a restoring force to the pedal so as to bring the position of the pedal closer to the reference position by changing the posture of the pedal in the second direction when the braking operation is released.

For example, the reaction force generating unit is configured to apply the reaction force to the pedal, which is greater than the restoring force applied to the pedal by the pedal restoring unit, when a posture of the pedal changes from the reference position in the first direction.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
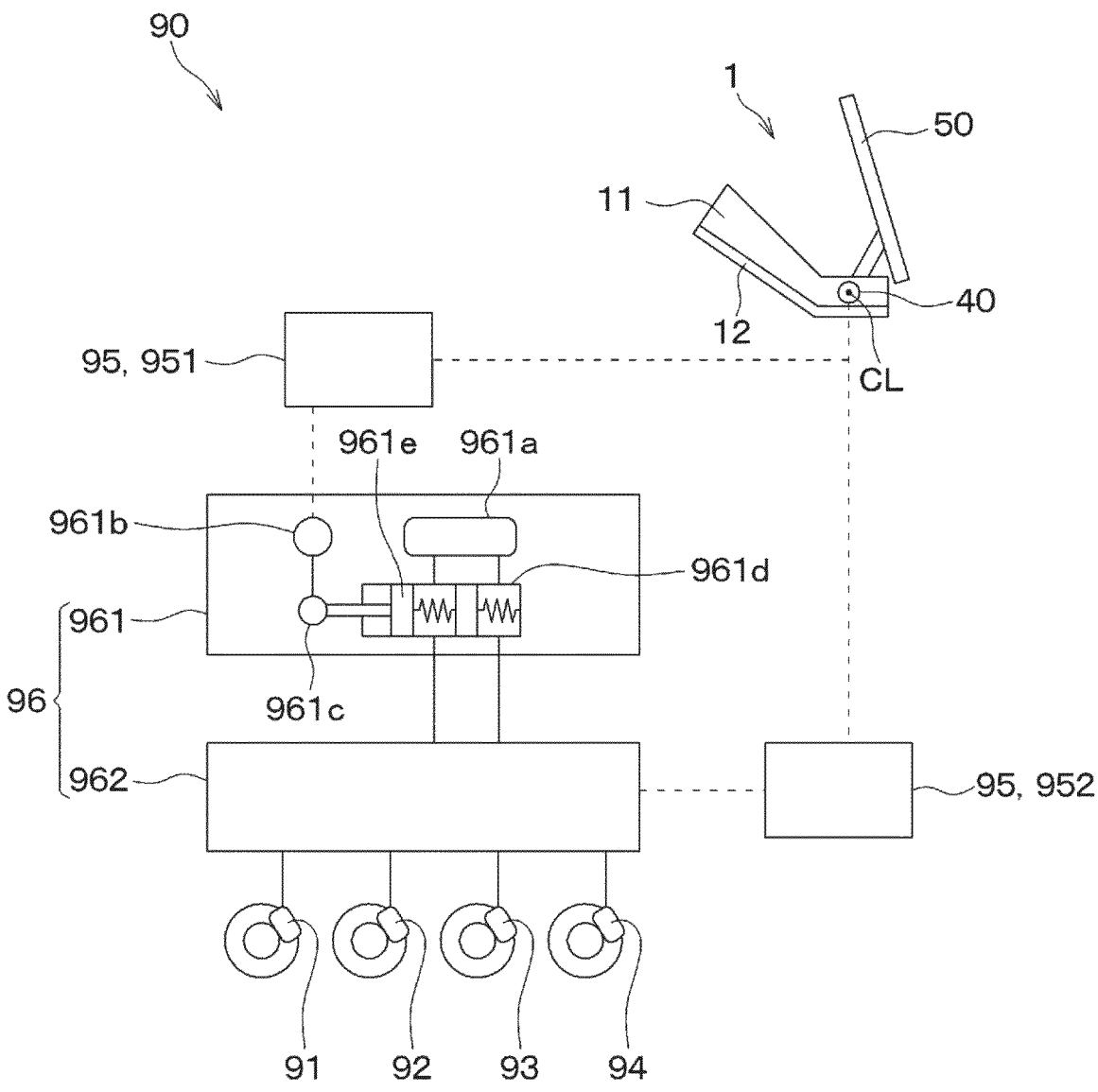
FIG. 1 is a schematic configuration diagram of a brake-by-wire system using a pedal device according to a first embodiment.

A brake device for a vehicle may include (i) a brake pedal having an arm that rotates about a rotation axis and a pedal that is stepped by a driver, and (ii) a spring mechanism including a stranded wire spring that is compressively deformed when the pedal is stepped. In such vehicle brake device, when a driver steps on the pedal, the arm rotates about a rotation axis with reference to a reference position. Then, the vehicle brake device brakes the vehicle by generating a braking force according to an amount of rotation of the arm. Further, when the arm rotates, the stranded wire spring that supports the arm is compressively deformed, and a reaction force corresponding to the amount of compressive deformation of the stranded wire spring is generated on the brake pedal. Then, when the driver's stepping operation is released, the stranded wire spring returns the brake pedal to the reference position by the reaction force generated by compressive deformation.

For example, in a pedal device equipped with a reaction force generating unit that generates a reaction force when a pedal stepping operation is performed, if the reaction force generating unit fails, the position of the brake pedal cannot be returned even when the stepping operation is released. In other words, if the reaction force generating unit fails, the posture of the brake pedal cannot be restored.

It is an object of the present disclosure to provide a pedal device that can bring a posture of a pedal closer to a reference position even when a reaction force generating unit fails.

According to an exemplar of the present disclosure, a pedal device includes a housing, a pedal a reaction force generating unit and a pedal restoring unit. The pedal is attached to the housing in a posture changeable from a reference position in a first direction by a braking operation of a driver, and changeable in a second direction opposite to the first direction when the braking operation is released. The reaction force generating unit is configured to apply a reaction force to the pedal against a load given by the braking operation due to elastic deformation when the posture of the pedal changes from the reference position in the first direction by the braking operation, and to restore a position of the pedal to the reference position by the reaction force when the braking operation is released. In addition, the pedal restoring unit is provided in parallel with the reaction force generating unit, and configured to be elastically deformed according to a change amount in the posture of the pedal, and to apply a restoring force to the pedal to bring the position of the pedal closer to the reference position by changing the posture of the pedal in the second direction when the braking operation is released.

According to the above exemplar, even when the pedal cannot be restored to the reference position by the reaction force of the reaction force generating unit due to a failure of the reaction force generating unit, the position of the pedal is brought closer to the reference position by the pedal restoring unit.

Hereinafter, embodiments of the present disclosure will be described with reference to the drawings. In the following embodiments, components that are the same as or equivalent to those described in the preceding embodiment(s) will be indicated by the same reference symbols, and the description thereof may be omitted. In the following embodiments, when only partial configuration is described in one embodiment, remaining configuration may be adopted from the preceding embodiments. The following embodiments may be partially combined with each other even when such a combination is not explicitly described as long as there is no disadvantage with respect to such a combination.

First Embodiment

The present embodiment will be described with reference to FIGS. 1 to 10. A pedal device 1 of the present embodiment is used, for example, as a brake pedal in a brake-by-wire system 90 that controls a brake of a vehicle. First, such brake-by-wire system 90 will be explained.

The brake-by-wire system 90 includes wheel cylinders 91 to 94, an ECU 95, a brake circuit 96, and a pedal device 1, as shown in FIG. 1.

The wheel cylinders 91 to 94 are arranged at each wheel of the vehicle. Further, brake pads (not shown) are attached to each of the wheel cylinders 91 to 94.

An ECU 95 includes a first ECU 951 and a second ECU 952. The first ECU 951 includes a microcomputer, a drive circuit, and the like (not shown). Further, the first ECU 951 controls a first brake circuit 961 of the brake circuit 96, which will be described later, based on a signal from the pedal device 1, which will be described later. The second ECU 952 includes a microcomputer, a drive circuit, and the like (not shown). Further, the second ECU 952 controls a second brake circuit 962 of the brake circuit 96, which will be described later, based on a signal from the pedal device 1, which will be described later.

The brake circuit 96 includes a first brake circuit 961 and a second brake circuit 962. The first brake circuit 961 includes a reservoir 961a, a motor 961b, a gear mechanism 961c, and a master cylinder 961d. The reservoir 961a stores brake fluid. The motor 961b drives the gear mechanism 961c. The gear mechanism 961c reciprocates a master piston 961e of the master cylinder 961d in an axial direction of the master cylinder 961d. The second brake circuit 962 includes a solenoid valve (not shown) and the like. Further, the second brake circuit 962 controls the hydraulic pressure of each of the wheel cylinders 91 to 94 by opening and closing a solenoid valve in response to a control signal from the second ECU 952.

Note that the first ECU 951 and the second ECU 952 of the present embodiment are connected to an accelerator sensor (not shown), and are configured to be capable of receiving a signal from an accelerator sensor according to an amount of accelerator opening that changes according to the driver's operation.

Here, in order to explain the pedal device 1 in the following, the longitudinal direction of the vehicle is defined as a vehicle longitudinal direction Da. The vertical direction of the vehicle is defined as a vehicle vertical direction Db. The left-right direction of the vehicle is defined as a vehicle left-right direction Dc. The front in the vehicle longitudinal direction Da is described as a vehicle front. The rear in the vehicle longitudinal direction Da is described as a vehicle rear. The upper part in the vehicle vertical direction Db is described as an upper part of the vehicle. The downward direction in the vehicle vertical direction Db is described as a vehicle lower part. The left side in the vehicle left-right direction Dc is described as a vehicle left side. The right side in the vehicle left-right direction Dc is described as a vehicle right side.

The pedal device 1 is an organ-type pedal device 1. Here, the organ-type pedal device 1 refers to a pedal device 1 having a configuration in which a part of a pedal 50 (to be described later) that is stepped on by the driver is arranged in an upper part of the vehicle with respect to the center of rotation of the pedal 50.

Figure 4:
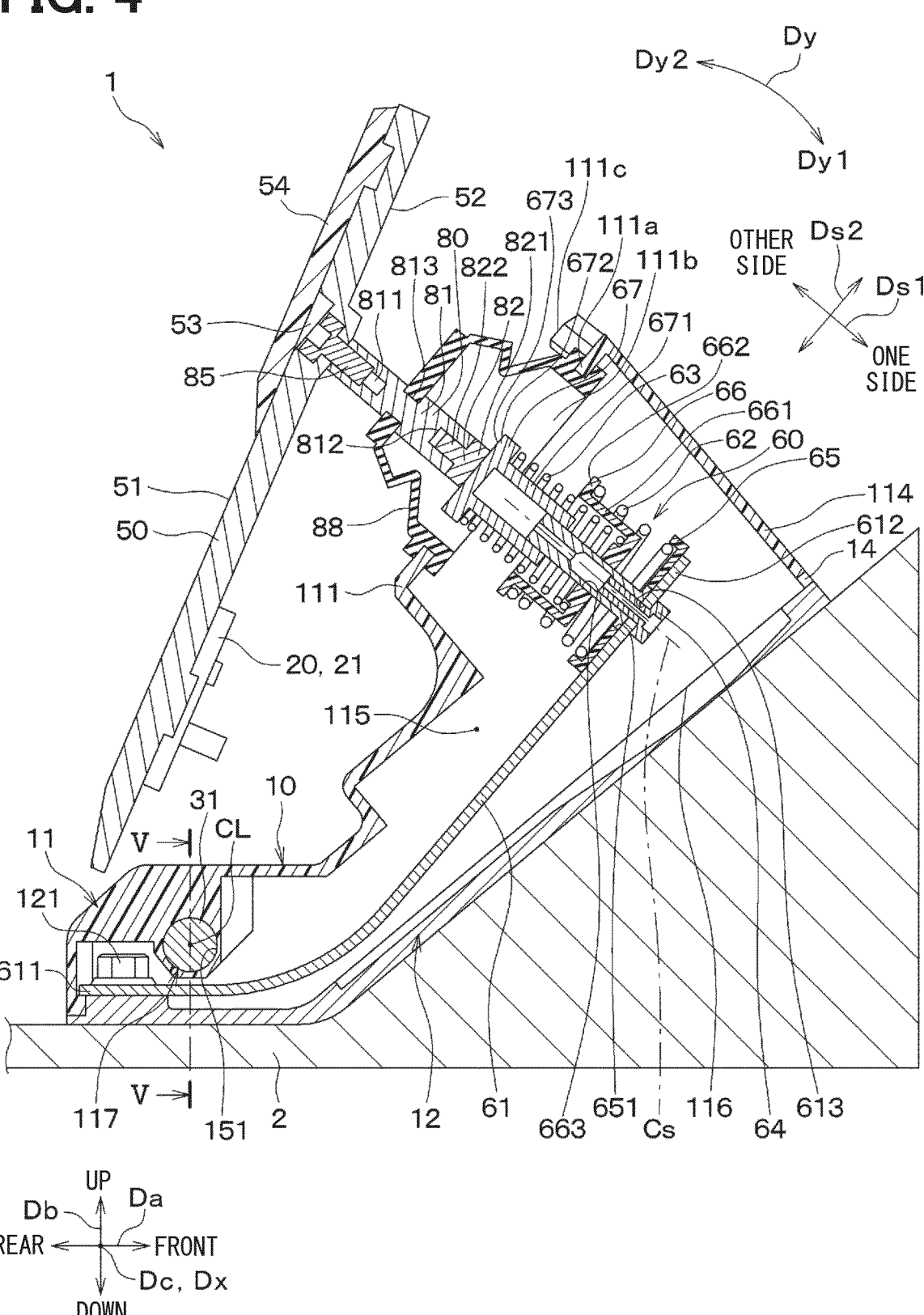
FIG. 4 is a cross-sectional view of the pedal device according to the first embodiment.

Further, in the organ-type pedal device 1, a posture of the pedal 50 changes according to the driver's braking operation. Specifically, in the organ-type pedal device 1, when the driver performs a stepping operation of the pedal 50 during the braking operation, a part of the pedal 50 in the vehicle upper part relative to the center of rotation rotates, as shown in FIG. 4, rotates toward a floor 2 toward a dash panel side (not shown) in a passenger compartment. When a braking operation is performed that increases the driver's stepping force applied to the pedal 50 and the amount of stepping of the pedal 50 increases, the part of the pedal 50 in an upper part of the vehicle relative to the center of rotation rotates to approach the floor 2 or the dash panel in the passenger compartment.

Further, when a braking operation is performed that reduces the driver's stepping force applied to the pedal 50 and the amount of stepping of the pedal 50 decreases, the part of the pedal 50 in the vehicle upper part relative to the center of rotation rotates away from the floor 2 or from the dash panel in the passenger compartment. In the organ-type pedal device 1, when the driver performs a brake release operation to release the stepping operation of the pedal 50, the pedal 50 is basically restored to a position before stepping of the pedal 50.

Figure 2:
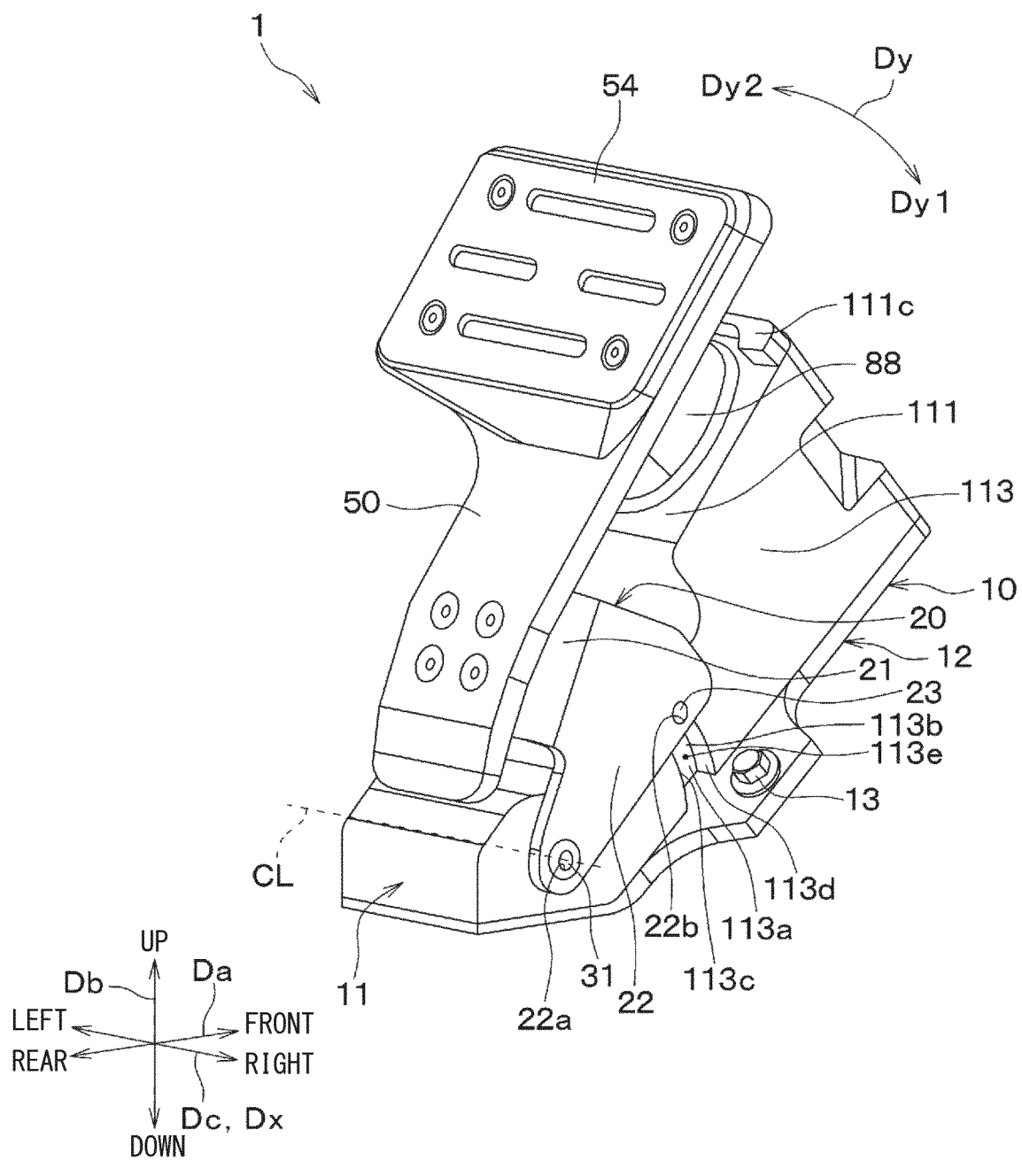
FIG. 2 is a perspective view of the pedal device according to the first embodiment.
Figure 5:
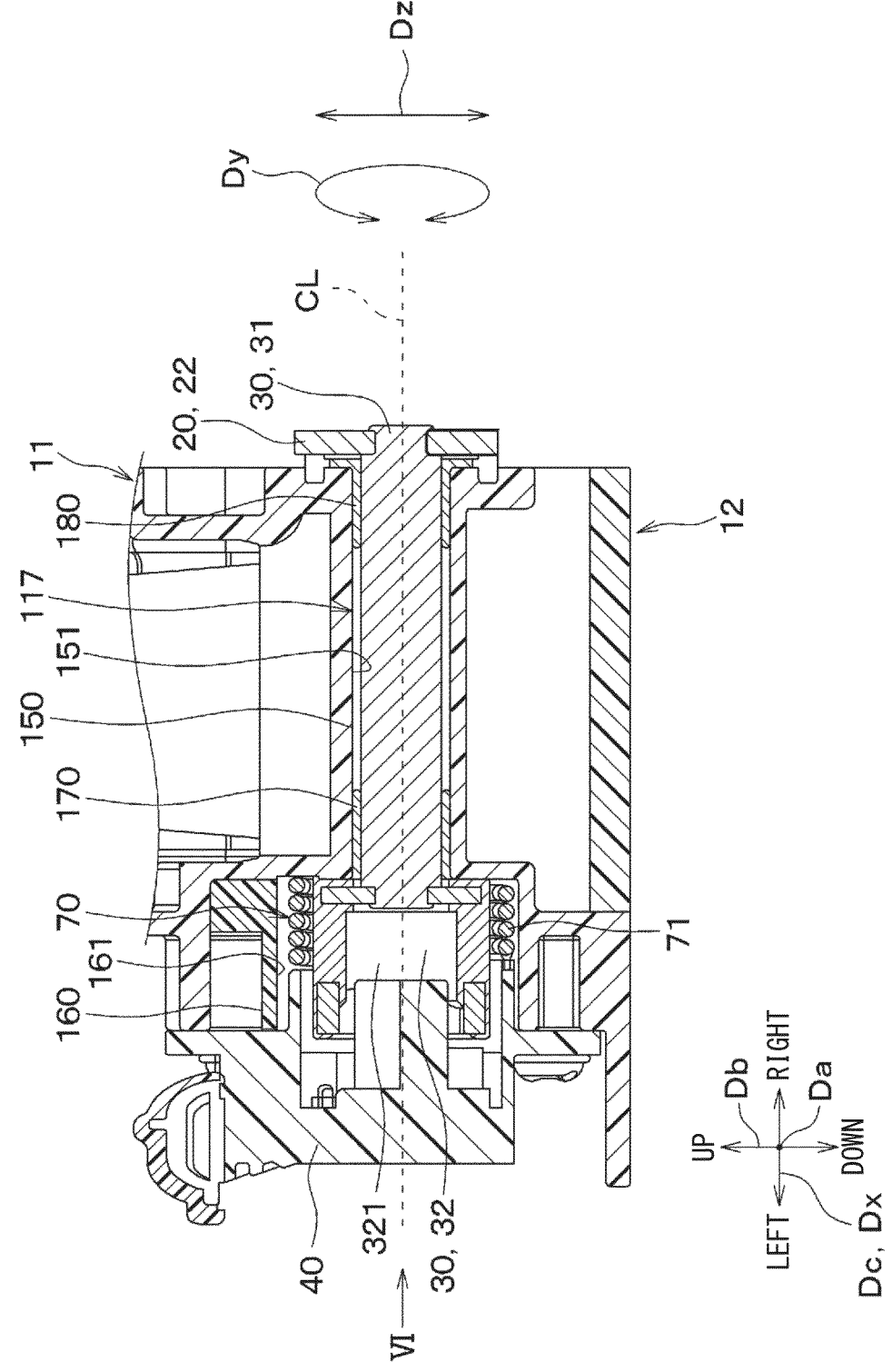
FIG. 5 is a cross-unital view taken along a line V-V of FIG. 4.

Hereinafter, as shown in FIGS. 2, 5 and the like, the center of rotation of the pedal 50 is designated as a rotation axis CL, an axial direction of the rotation axis CL is designated as a rotation axis direction Dx, the circumferential direction of the rotation axis CL is designated as a rotation axis circumferential direction Dy, the radial direction of the rotation axis CL is designated as a rotation axis radial direction Dz. Further, in the rotation axis circumferential direction Dy, the direction in which the pedal 50 rotates when the driver performs a braking operation by stepping on the pedal 50 is designated as a first circumferential direction Dy1, and the direction opposite to the first circumferential direction Dy1 is a second circumferential direction Dy2. The second circumferential direction Dy2 is a direction in which the pedal 50 rotates when the driver releases the braking operation in a state in which the pedal 50 is being stepped.

The rotation axis CL of the present embodiment has a rotation axis direction Dx aligned along the vehicle left-right direction Dc. That is, the rotation axis direction Dx coincides with the vehicle left-right direction Dc. The rotation axis CL corresponds to a predetermined rotation axis. The first circumferential direction Dy1 corresponds to a first direction. The second circumferential direction Dy2 corresponds to a second direction.

As shown in FIGS. 2 to 5, the pedal device 1 includes a housing 10, a rotating plate 20, a rotating member 30, a sensor unit 40, the pedal 50, a reaction force generating mechanism 60, and a pedal restoring unit 70. The pedal device 1 also includes a connecting rod 80, a rod connecting screw 85, and a covering member 88.

The housing 10 includes a first housing 11, a second housing 12, a housing bolt 13, and a breathing hole 14.

The first housing 11 is box-shaped and made of resin. The first housing 11 also includes an upper wall 111, a left side wall 112, a right side wall 113, a front wall 114, a housing space 115, a housing opening 116, and a rotation support unit 117.

Figure 3:
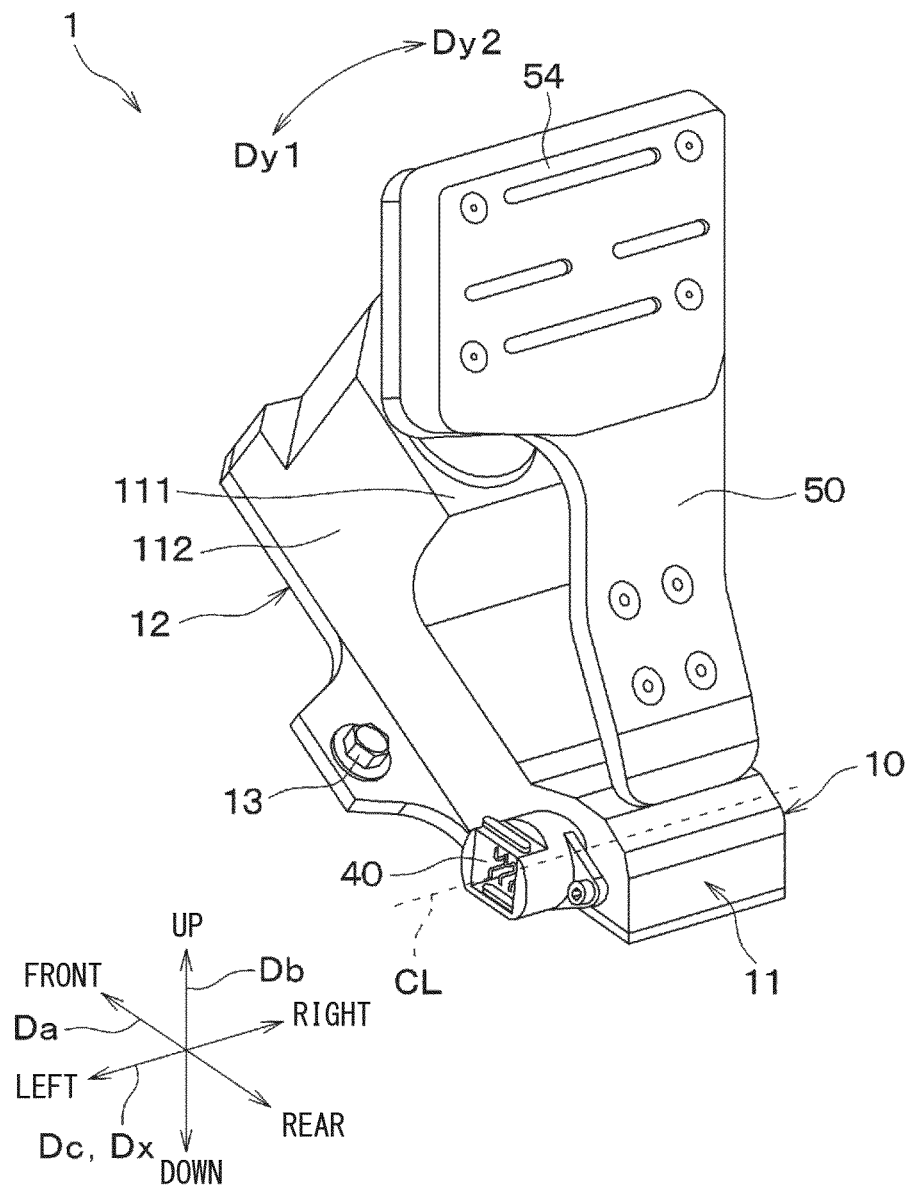
FIG. 3 is another perspective view of the pedal device according to the first embodiment.

The upper wall 111 is a wall of the first housing 11 on the upper side of the vehicle, as shown in FIGS. 2 to 4. Further, as shown in FIG. 4, the upper wall 111 includes a housing end 111a, a housing hole 111b, and a depression stopper 111c. The housing end 111a forms the housing hole 111b. The reaction force generating mechanism 60 is inserted into the housing hole 111b. The depression stopper 111c is provided at a portion of the upper wall 111 that is located further in the vehicle front than the rotation axis CL. Specifically, the depression stopper 111c is provided at an upper end of the upper wall 111.

The left side wall 112 is a wall on the vehicle left side of the first housing 11, as shown in FIG. 3. The right side wall 113 is a wall on the vehicle right side of the first housing 11, as shown in FIG. 2. Further, the right side wall 113 includes a wall recess 113a.

The wall recess 113a is recessed from an outer surface of the right side wall 113 toward the left side of the vehicle. Further, the wall recess 113a includes a wall bottom surface 113b, a wall first side surface 113c, a wall second side surface 113d, and a wall space 113e.

The wall bottom surface 113b is a surface facing to the right side of the vehicle. Further, the wall bottom surface 113b is formed in a circular arc planar shape centered on the rotation axis CL.

The wall first side surface 113c is connected to the vehicle rear side of the wall bottom surface 113b. Further, the wall first side surface 113c is formed in the shape of a side surface of an arcuate column centered on the rotation axis CL.

The wall second side surface 113d is connected to the vehicle front side of the wall bottom surface 113b. Further, the wall second side surface 113d is formed in the shape of a side surface of an arcuate column centered on the rotation axis CL.

The wall space 113e is a space formed by the wall bottom surface 113b, the wall first side surface 113c, and the wall second side surface 113d. Further, the wall space 113e is formed in an arc shape centered on the rotation axis CL by the shapes of the wall bottom surface 113b, the wall first side surface 113c, and the wall second side surface 113d. An opening stopper 23 of the rotating plate 20, which will be described later, is inserted into the wall space 113e.

The front wall 114 is a wall of the first housing 11 on the vehicle front side, as shown in FIG. 4. The housing space 115 is a space formed by the upper wall 111, the left side wall 112, the right side wall 113, and the front wall 114. Most of the reaction force generating mechanism 60 is housed in the housing space 115.

The housing opening 116 is an opening space formed by the ends of the upper wall 111, the left side wall 112, the right side wall 113, and the front wall 114 on the lower side of the vehicle in the housing space 115. The housing opening 116 is closed by the second housing 12.

Figures 6, 7:
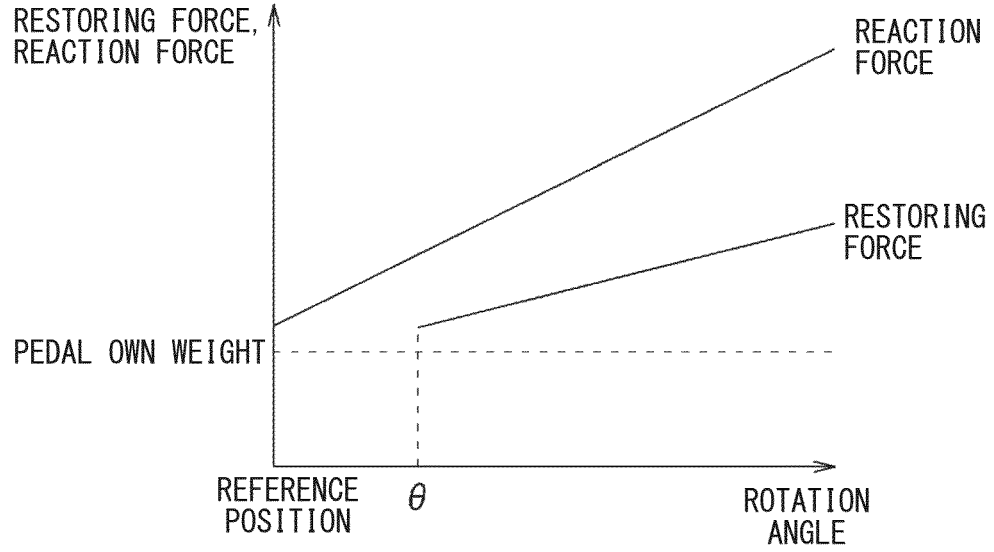
FIG. 6 is a side view of the pedal device viewed from a direction of an arrow VI in FIG. 5.
FIG. 7 is a diagram showing a relationship between a restoring force generated by a pedal restoring unit and a reaction force generated by a reaction force generating unit according to the first embodiment.

The rotation support unit 117 is a part that supports the rotating member 30. As shown in FIGS. 5 and 6, the rotation support unit 117 includes a shaft hole forming portion 150, a guide hole forming portion 160, a left bearing portion 170, and a right bearing portion 180.

The shaft hole forming portion 150 is a portion that forms a shaft hole 151 into which a shaft 31 (described later) of the rotating member 30 is inserted. As shown in FIG. 5, the shaft hole forming portion 150 forms a cylindrical shaft hole 151 that extends in the rotation axis direction Dx, that is, in the vehicle left-right direction Dc, centering on the rotation axis CL. The shaft hole 151 is a space into which the shaft 31 is inserted.

The shaft hole 151 is formed from the vehicle right side of the first housing 11 toward the vehicle left side. A guide hole 161, which will be described later, communicates with the shaft hole 151 on the vehicle left side. The shaft 31, which will be described later, is inserted into the shaft hole 151.

The left bearing portion 170 and the right bearing portion 180 that rotatably support the shaft 31 inserted into the shaft hole 151 are provided on the vehicle right side and the vehicle left side of the shaft hole 151. The left bearing portion 170 rotatably supports the vehicle left side of the shaft 31. The right bearing portion 180 rotatably supports the vehicle right side of the shaft 31.

The guide hole forming portion 160 is a portion that forms the guide hole 161 into which a guide unit 32 (described later) of the rotating member 30 and the pedal restoring unit 70 (described later) are inserted. The guide hole forming portion 160 forms a cylindrical guide hole 161 that extends in the rotation axis direction Dx, that is, in the vehicle left-right direction Dc, centering on the rotation axis CL. Further, the guide hole forming portion 160 includes a guide hole recess 161a continuous to a side surface of the guide hole 161, as shown in FIG. 6.

The guide hole 161 is a space formed from the vehicle left side of the first housing 11 toward the vehicle right side to reach the shaft hole 151. The guide hole 161 is formed to have a larger diameter than the shaft hole 151. The guide unit 32 and the pedal restoring unit 70 are inserted into the guide hole 161. The guide hole 161 communicates with the shaft hole 151 on the right side of the vehicle. Further, the sensor unit 40 is attached to the left side of the guide hole 161 in the vehicle. Note that in FIG. 6, the sensor unit 40 is omitted for convenience of explanation.

The guide hole recess 161a is a part that supports the pedal restoring unit 70 inserted into the guide hole 161. The guide hole recess 161a is formed to be recessed from the side surface of the guide hole 161 toward an outside in the rotation axis radial direction Dz. The guide hole recess 161a includes a hole bottom surface 161b, a hole first side surface 161c, a hole second side surface 161d, a hole third side surface 161e, and a hole space 161f.

The hole bottom surface 161b is a surface facing the vehicle left side. Further, the hole bottom surface 161b is formed in a planar shape extending parallel to the rotation axis radial direction Dz.

The hole first side surface 161c is connected to the vehicle upper side of the hole bottom surface 161b. Further, the hole first side surface 161c extends in a planar shape along the rotation axis radial direction Dz toward the outside in the rotation axis radial direction Dz from a portion where the guide hole 161 and the guide hole recess 161a are connected.

The hole second side surface 161d is connected to the vehicle lower side of the hole bottom surface 161b. Further, the hole second side surface 161d extends in a planar shape along the rotation axis radial direction Dz toward the outside in the rotation axis radial direction Dz from a portion where the guide hole 161 and the guide hole recess 161a are connected. The hole first side surface 161c and the hole second side surface 161d have portions that face each other in the rotation axis circumferential direction Dy.

The hole third side surface 161e is provided at a position between the hole first side surface 161c and the hole second side surface 161d. Further, the hole third side surface 161e extends in a planar shape that intersects with the rotation axis radial direction Dz, and the vehicle right side thereof is connected to the hole bottom surface 161b. Further, one side of the hole third side surface 161e in the direction intersecting the rotation axis radial direction Dz is connected to an outer part of the hole first side surface 161c in the rotation axis radial direction Dz, and the other side thereof is connected to the outer part of the hole second side surface 161d in the rotation axis radial direction Dz.

The hole space 161f is a space formed by the hole bottom surface 161b, the hole first side surface 161c, the hole second side surface 161d, and the hole third side surface 161e. A part of the pedal restoring unit 70 inserted into the guide hole 161 is fitted into the hole space 161f.

Returning to FIG. 4, the second housing 12 is formed in a plate shape, and is connected to an end of the upper wall 111 of the first housing 11 on the vehicle lower side, an end of the left wall 112 on the vehicle lower side, an end of the right side wall 113 on the vehicle lower side, and an end of the front wall 114 on the vehicle lower side. That is, the second housing 12 extends continuously from the portion of the first housing 11 on the vehicle front side to the portion on the vehicle rear side. Further, the second housing 12 is provided on the opposite side of the first housing 11 from the side where the pedal 50 is provided. Thereby, the second housing 12 closes the housing opening 116. Further, the second housing 12 is made of metal.

Further, as shown in FIGS. 2 and 3, the second housing 12 is fixed to the floor 2 by inserting housing bolts 13 into bolt holes (not shown) and holes in the floor 2 corresponding to the bolt holes. Thereby, the pedal device 1 is fixed to the floor 2. That is, the first housing 11 and the second housing 12 are non-rotating members that are fixed to the vehicle body and do not rotate. The housing 10 including the first housing 11 and the second housing 12 functions as a housing that supports the pedal 50, the reaction force generating mechanism 60, and the like. Note that the floor 2 constitutes the floor of the passenger compartment.

The breathing hole 14 is a space formed at a position between the first housing 11 and the second housing 12, as shown in FIG. 4. Therefore, the breathing hole 14 communicates with the housing space 115 and the space outside the housing 10. Further, the breathing hole 14 is formed, for example, at a position between an end of a portion of the front wall 114 of the first housing 11 on the vehicle front side and the vehicle lower side, and a portion of the second housing 12 on the vehicle front side and the vehicle upper side.

As shown in FIG. 2, the rotating plate 20 is made of metal and has an L-shape. Further, the rotating plate 20 has a back plate part 21, a side plate part 22, and the opening stopper 23. The rotating plate 20 is provided on a surface of the pedal 50 that is opposite to the surface that receives the stepping force from the driver. The back plate part 21 of the rotating plate 20 is fixed to the surface of the pedal 50 opposite to the surface receiving the stepping force from the driver, for example, by screwing or the like. Therefore, the rotating plate 20 rotates together with the pedal 50 about the rotation axis CL.

The side plate part 22 is vertically connected to the vehicle right side of the back plate part 21. Further, the side plate part 22 is arranged on the vehicle right side of the first housing 11. The side plate part 22 includes a shaft hole 22a and a stopper hole 22b.

The side plate part 22 is connected to the shaft 31 by inserting the shaft 31 into the shaft hole 22a. Thereby, the rotating plate 20 rotates together with the shaft 31 about the rotation axis CL.

The stopper hole 22b is formed closer to the vehicle front side than the shaft hole 22a. Further, the stopper hole 22b is formed at a position overlapping with the wall space 113e in the rotation axis direction Dx. Further, the opening stopper 23 is inserted into the stopper hole 22b.

The opening stopper 23 is a shaft fixed to the stopper hole 22b, protrudes from the side plate part 22 toward the first housing 11 along the vehicle left-right direction Dc, and enters the wall space 113e. Therefore, the opening stopper 23 moves inside the wall space 113e about the rotation axis CL when the rotating plate 20 rotates together with the pedal 50 and the shaft 31 in the rotation axis circumferential direction Dy.

When the driver is not performing a braking operation, the opening stopper 23 abuts against the first housing 11 at an end of the wall space 113e in the second circumferential direction Dy2, thereby restricting the rotation of the rotating plate 20 in the second circumferential direction Dy2.

The rotating member 30 is a rotating part that rotates together with the pedal 50. The rotating member 30 includes the shaft 31 and the guide unit 32, as shown in FIGS. 5 and 6. The shaft 31 is made of metal, and has a cylindrical shape. The shaft 31 is inserted into the shaft hole 151, and the vehicle right side thereof is rotatably supported by the right bearing portion 180, and the vehicle left side thereof is rotatably supported by the left bearing portion 170. Thereby, the shaft 31 is attached to the housing 10 to be rotatable in the first circumferential direction Dy1 and the second circumferential direction Dy2. Further, the rotating plate 20 is connected to the vehicle right side of the shaft 31. The guide unit 32 is connected to the vehicle left side of the shaft 31.

The guide unit 32 transmits a rotational force of the shaft 31 to the pedal restoring unit 70, which will be described later. The guide unit 32 is made of metal, and is inserted into the guide hole 161. The guide unit 32 includes a connecting portion 321 and a guide stopper 322.

As shown in FIGS. 5 and 6, the connecting portion 321 is formed in a hollow cylindrical shape with the rotation axis CL as its center. That is, the connecting portion 321 is arranged coaxially with the shaft hole 151 and the guide hole 161, and extends along the vehicle left-right direction Dc. The connecting portion 321 is fixed to the shaft 31 on the vehicle right side, and is configured to be rotatable in the first circumferential direction Dy1 and the second circumferential direction Dy2 together with the shaft 31 by the rotational force when the shaft 31 rotates. Further, the guide stopper 322 is provided at an end of the connecting portion 321 on the vehicle left side.

The guide stopper 322 is a part that presses the pedal restoring unit 70 inserted into the guide hole 161, which will be described later. The guide stopper 322 protrudes from an end of the side surface of the connecting portion 321 on the vehicle left side toward the outside in the rotation axis radial direction Dz.

When the guide unit 32 rotates together with the shaft 31, the guide stopper 322 presses the pedal restoring unit 70, thereby transmitting the rotational force of the shaft 31 to the pedal restoring unit 70 via the guide stopper 322.

The sensor unit 40 is a rotation angle sensor that detects a rotation angle of the shaft 31. The sensor unit 40 is arranged on the vehicle left side of the guide hole 161. Specifically, the sensor unit 40 includes a magnet, a yoke, a Hall element, and the like (not shown). The sensor unit 40 detects the rotation angle when the shaft 31 rotates in the rotation axis circumferential direction Dy using the magnet, the yoke, the Hall element, and the like.

Here, the shaft 31 is fixed to the pedal 50 via the rotating plate 20 as described above. Therefore, the shaft 31 and the guide unit 32 attached to the shaft 31 rotate together with the pedal 50. Therefore, the rotation angle of the shaft 31 is equal to the rotation angle of the pedal 50. By detecting the rotation angle of the shaft 31, the sensor unit 40 detects the rotation angle of the pedal 50, which changes according to the driver's braking operation. In other words, the sensor unit 40 detects an amount of rotation of the pedal 50 that rotates together with the shaft 31 in the rotation axis circumferential direction Dy. The sensor unit 40 functions as a pedal detection unit that detects information regarding the posture of the pedal 50.

The sensor unit 40 is connected to the first ECU 951 and the second ECU 952, and outputs a signal corresponding to the detected rotation angle of the pedal 50 to the first ECU 951 and the second ECU 952. Note that the sensor unit 40 may include an MR element instead of the Hall element. MR is an abbreviation for Magneto Resistive. Further, the sensor unit 40 may be an inductive sensor that detects the rotation angle using a coil.

Further, the sensor unit 40 is attached to the vehicle left side of the guide hole 161, and covers the vehicle left side of the guide hole 161. That is, the sensor unit 40 closes a space formed by the guide hole forming portion 160 in the first housing 11. Thereby, the guide unit 32 and the pedal restoring unit 70 inserted into the guide hole 161 are housed in the first housing 11.

Returning to FIG. 4, the pedal 50 is formed in a plate shape, and is made of, for example, metal, resin or the like. The pedal 50 is attached to the rotating plate 20 via the shaft 31 to be rotatable about the rotation axis CL. Specifically, the pedal 50 has a vehicle lower portion fixed to the shaft 31 via the rotating plate 20, and is attached to the housing 10 via the shaft 31.

The pedal 50 includes a pedal surface 51, a pedal back surface 52, a rod fixing hole 53, and a pad 54. The pedal surface 51 is a surface of the pedal 50 that faces the driver. The pedal back surface 52 is a surface of the pedal 50 that is opposite to the pedal surface 51.

The rod fixing hole 53 is formed to penetrate the pedal 50 from the pedal surface 51 to the pedal back surface 52. A rod connecting screw 85 to be inserted into a connecting rod 80, which will be described later, is inserted into the rod fixing hole 53. The pedal 50 is supported by the reaction force generating mechanism 60 via the connecting rod 80.

The pad 54 is a part that is stepped on by the driver of the vehicle. The pad 54 is made of, for example, rubber. Further, the pad 54 is connected to a vehicle upper part of the pedal surface 51. The pad 54 covers the pedal surface 51 side of the rod fixing hole 53. Thereby, the rod fixing hole 53 is not visible to the driver of the vehicle.

The pedal 50 configured as described above is arranged diagonally with respect to the vehicle longitudinal direction Da and the vehicle vertical direction Db by the reaction force generating mechanism 60 in a braking operation released state, i.e., when the driver is not stepping on the pedal. Specifically, in the braking operation released state, the pedal 50 is supported by the reaction force generating mechanism 60 with the upper end of the pedal 50 diagonally arranged in the vehicle front and in the vehicle upper part with respect to the vehicle lower end.

Further, a load applicable to the pedal 50 itself due to its own weight when the pedal 50 is placed at an initial position in the braking operation released state is applied in a direction of rotating the pedal 50 in the first circumferential direction Dy1 about the rotation axis CL. Further, in the braking operation released state, if the pedal 50 is not supported by the reaction force generating mechanism 60, the pedal 50 is configured to be rotatable in the first circumferential direction Dy1 about the rotation axis CL integrally with the shaft 31 and the rotating plate 20 due to its own weight. Hereinafter, the initial position of the pedal 50 when it is supported by the reaction force generating mechanism 60 in the braking operation released state in which no stepping operation is performed by the driver may also be referred to as a reference position.

Further, the pedal 50 is configured to be rotatable in the first circumferential direction Dy1 about the rotation axis CL when the driver performs a braking operation by stepping on the pedal 50. That is, the pedal 50 rotates from the reference position toward the first circumferential direction Dy1 side together with the shaft 31 and the rotating plate 20 as the driver performs a braking operation by stepping on the pedal 50.

The pedal 50 rotates about the rotation axis CL within a limited predetermined angular range (i.e., a movable range) of less than one rotation with respect to the reference position as the driver performs a braking operation by stepping on the pedal 50. The above-mentioned angular range in the rotational movement of the pedal 50 is specifically a range from a minimum rotational position to a maximum rotational position of the pedal 50.

For example, within the angular range, the pedal 50 is configured to rotate in the first circumferential direction Dy1, such that the upper end of the pedal 50 is displaced toward the vehicle front and toward the vehicle lower part, when a braking operation is performed in which the driver's stepping force applied to the pedal 50 increases. That is, as the driver's stepping force increases, the pedal 50 rotates to be tilted away from the reference position.

On the other hand, when a braking operation is performed such that the driver's stepping force applied to the pedal 50 is reduced, the upper end of the pedal 50 rotates in the second circumferential direction Dy2 such that the upper end of the pedal 50 is displaced toward the vehicle rear and toward the vehicle upper part due to the action of the reaction force generating mechanism 60. That is, the pedal 50 rotates closer to the reference position as the driver's stepping force decreases. Then, when the driver's braking operation is released, the pedal 50 is restored to the reference position by the action of the reaction force generating mechanism 60.

The reaction force generating mechanism 60 generates a reaction force against the load applied via the pedal 50 when the driver performs a braking operation. That is, the reaction force generating mechanism 60 generates a reaction force against the driver's stepping force. For example, as shown in FIG. 4, the reaction force generating mechanism 60 includes a leaf spring 61, a large-diameter coil spring 62, and a small-diameter coil spring 63, which are respectively elastically deformed when the pedal 50 rotates in the first circumferential direction Dy1. Further, for connecting the leaf spring 61, the large-diameter coil spring 62, and the small-diameter coil spring 63, the reaction force generating mechanism 60 also includes a fastening member 64 a lower holder 65, a spring seat 66, and an upper holder 67.

The reaction force generating mechanism 60 applies a reaction force to the pedal 50 against the stepping force of the driver, by utilizing the driver's stepping force applied to the pedal 50 to elastically deform the leaf spring 61, the large-diameter coil spring 62, and the small-diameter coil spring 63. In addition, the reaction force generating mechanism 60 restores the pedal 50 back to the reference position by utilizing the restoration force from the elastically-deformed leaf spring 61, the large-diameter coil spring 62, and the small-diameter coil spring 63 when the driver's braking operation is released. In the present embodiment, the leaf spring 61, the large-diameter coil spring 62, and the small-diameter coil spring 63 function as a reaction force generating unit.

The leaf spring 61 is bent to have a convex curved shape toward the floor 2 in a state where it is not receiving a load. Further, a plate end portion 611 that is one end portion of the leaf spring 61 is connected to the vehicle rear side of the second housing 12. Specifically, the leaf spring 61 is fixed to the second housing 12 with bolts 121. Thereby, the reaction force generating mechanism 60 is supported by the second housing 12. The lower holder 65 is connected to an other end 612 of the leaf spring 61 by the fastening member 64.

The fastening member 64 is a cylindrical rod-like member extending in a predetermined axial direction, and passes through a fastening hole 613 provided near the other end 612 of the leaf spring 61. Hereinafter, as shown in FIG. 4, the predetermined axis of the fastening member 64 is also referred to as a coil axis Cs, the axial direction of the coil axis Cs is also referred to as a coil axis direction Ds1, and the radial direction of the coil axis Cs is also referred to as a coil radial direction Ds2.

The lower holder 65 is a member that supports the large-diameter coil spring 62. Specifically, the lower holder 65 supports one end of the large-diameter coil spring 62 in a direction in which the large-diameter coil spring 62 is elastically deformed. The lower holder 65 has a plate shape with the thickness direction set in the coil axis direction Ds1, and has a lower holder hole 651 formed substantially at the center thereof that penetrates in the coil axis direction Ds1. The lower holder 65 is connected to the leaf spring 61 by inserting the fastening member 64 into the lower holder hole 651.

The large-diameter coil spring 62 is a compression coil spring whose axis is set as the coil axis Cs. That is, the large-diameter coil spring 62 is formed by being wound around the coil axis Cs. The large-diameter coil spring 62 is elastically deformed in the coil axis direction Ds1 by the driver's stepping force applied to the pedal 50, thereby generating an elastic force.

One side of the large-diameter coil spring 62 in the coil axis direction Ds1 is connected to one side of the lower holder 65 opposite to the one to which the leaf spring 61 is connected. Further, the large-diameter coil spring 62 is connected to the spring seat 66 on the other side in the coil axis direction Ds1. The large-diameter coil spring 62 is arranged at a position between the lower holder 65 and the spring seat 66 in a compressed state.

The spring seat 66 is a member that supports the large-diameter coil spring 62 and the small-diameter coil spring 63. Specifically, the spring seat 66 supports the other side of the large-diameter coil spring 62 in the coil axis direction Ds1, and supports one side of the small-diameter coil spring 63 in the coil axis direction Ds1. The spring seat 66 has a spring seat small-diameter portion 661 and a spring seat large-diameter portion 662.

The spring seat small-diameter portion 661 is formed in a bottomed cylindrical shape having a bottom on one side in the coil axis direction Ds1. Further, an outer diameter of the spring seat small-diameter portion 661 is formed to be slightly smaller than an inner diameter of the large-diameter coil spring 62. The spring seat small-diameter portion 661 is arranged in a space inside the large-diameter coil spring 62. Further, the size of the spring seat small-diameter portion 661 in the coil axis direction Ds1 is smaller than the size of the large-diameter coil spring 62 in the coil axis direction Ds1.

A spring seat hole 663 is formed on the bottom side of the spring seat small-diameter portion 661 approximately at the center thereof and penetrates in the coil axis direction Ds1. The spring seat 66 is connected to the fastening member 64 by inserting the fastening member 64 into the spring seat hole 663.

The spring seat large-diameter portion 662 is connected to one side of the spring seat small-diameter portion 661 opposite to the bottom side, and extends in a thin plate shape from the other side of the spring seat small-diameter portion 661 in the coil axis direction Ds1 toward the outside in the coil radial direction Ds2. That is, the spring seat large-diameter portion 662 is connected to the other side of the spring seat small-diameter portion 661 in the coil axis direction Ds1. Further, the outer diameter of the spring seat large-diameter portion 662 is greater than the outer diameter of the spring seat small-diameter portion 661.

Further, the outer diameter of the spring seat large-diameter portion 662 is greater than the outer diameter of the large-diameter coil spring 62. One surface of the spring seat large-diameter portion 662 in the coil axis direction Ds1 supports the other side of the large-diameter coil spring 62 in the coil axis direction Ds1. Thereby, the spring seat 66 and the large-diameter coil spring 62 are connected.

Further, the spring seat 66 houses a portion of the small-diameter coil spring 63 therein. Further, the small-diameter coil spring 63 is connected to the bottom side of the spring seat small-diameter portion 661.

The small-diameter coil spring 63 is a compression coil spring whose axis is set as the coil axis Cs. That is, the small-diameter coil spring 63 is arranged coaxially with the large-diameter coil spring 62, and is formed by being wound around the coil axis Cs. The small-diameter coil spring 63 is elastically deformed in the coil axis direction Ds1 by the driver's stepping force applied to the pedal 50, thereby generating an elastic force.

The small-diameter coil spring 63 has one side connected to the bottom side of the spring seat small-diameter portion 661 in the coil axis direction Ds1, and the other side connected to the upper holder 67. In addition, a portion of the small-diameter coil spring 63 housed in the spring seat small-diameter portion 661 overlaps with a portion of the large-diameter coil spring 62 that houses the spring seat small-diameter portion 661 in the coil radial direction Ds2. The small-diameter coil spring 63 is arranged in a compressed state at a position between the spring seat 66 and the upper holder 67.

The upper holder 67 is a member that supports the small-diameter coil spring 63. Specifically, the upper holder 67 has a holder small-diameter portion 671 and a holder large-diameter portion 672. The holder small-diameter portion 671 is formed in a cylindrical shape. Further, an outer diameter of the holder small-diameter portion 671 is smaller than an inner diameter of the small-diameter coil spring 63. The holder small-diameter portion 671 is arranged in a space inside the small-diameter coil spring 63.

Further, the size of the holder small-diameter portion 671 in the coil axis direction Ds1 is smaller than the size of the small-diameter coil spring 63 in the coil axis direction Ds1. Further, the holder small-diameter portion 671 has the fastening member 64 inserted into an inner space thereof. Thereby, the leaf spring 61, the lower holder 65, the spring seat 66, and the upper holder 67 are connected to each other via the fastening member 64.

Further, the leaf spring 61, the large-diameter coil spring 62, and the small-diameter coil spring 63 are connected in such order from one side to the other side in the coil axis direction Ds1 between the pedal 50 and the second housing 12. The leaf spring 61, the large-diameter coil spring 62, and the small-diameter coil spring 63 are mutually supported by elastic forces generated by each of them, and generate a reaction force against the driver's stepping force applied to the pedal 50. That is, the leaf spring 61, the large-diameter coil spring 62, and the small-diameter coil spring 63 are connected in series along the coil axis direction Ds1.

Further, when the large-diameter coil spring 62 and the small-diameter coil spring 63 are elastically deformed in the coil axis direction Ds1 by the driver's stepping force, the fastening member 64 is formed to be slidable on an inner circumferential surface of the lower holder hole 651, an inner circumferential surface of the spring seat hole 663 and an inner circumferential surface of the holder small-diameter portion 671.

The holder large-diameter portion 672 is connected to the other side of the holder small-diameter portion 671 in the coil axis direction Ds1, and is formed in a thin plate shape that closes the holder small-diameter portion 671. An outer diameter of the holder large-diameter portion 672 is greater than the outer diameter of the holder small-diameter portion 671.

Further, the outer diameter of the holder large-diameter portion 672 is greater than the outer diameter of the small-diameter coil spring 63. A surface of the holder large-diameter portion 672 on one side in the coil axis direction Ds1 supports the other side of the small-diameter coil spring 63 in the coil axis direction Ds1. Thereby, the upper holder 67 and the small-diameter coil spring 63 are connected.

Further, the holder large-diameter portion 672 has a contact surface 673 on the other side in the coil axis direction Ds1 and in contact with the connecting rod 80, which will be described later. The contact surface 673 is a surface of the holder large-diameter portion 672 that is opposite to the side that supports the small-diameter coil spring 63, and is formed in a planar shape extending along the coil radial direction Ds2.

The reaction force generating mechanism 60 configured in such manner generates a reaction force that restores the pedal 50 to the reference position by utilizing elastic force generated by elastic deformation of the leaf spring 61, large-diameter coil spring 62, and small-diameter coil spring 63. Further, the reaction force generating mechanism 60 is set such that a total of the elastic forces generated by the leaf spring 61, the large-diameter coil spring 62, and the small-diameter coil spring 63 is equal to or greater than a load that is required to restore the pedal 50 back to the reference position. That is, the reaction force generating mechanism 60 is configured to be capable of applying a reaction force to the pedal 50 which is equal to or greater than the load required to restore the pedal 50, which is movably positioned away from the reference position in the first circumferential direction Dy1, back to the reference position.

The connecting rod 80 is provided at a position between the pedal 50 and the upper holder 67, and connects the pedal 50 and the upper holder 67. The connecting rod 80 transmits the stepping force applied to the pedal 50 by the driver to the upper holder 67 as the pedal 50 rotates in the first circumferential direction Dy1. The connecting rod 80 is made of metal, and has a rod shape. Further, the connecting rod 80 is provided on a pedal back surface 52 side of the pedal 50 to protrude from the pedal 50. As shown in FIG. 4, the connecting rod 80 has an arm portion 81 connected to the pedal back surface 52, and a pressing portion 82 that presses the upper holder 67.

The arm portion 81 includes an arm hole 811, an arm recess 812, and a covering portion recess 813. The arm hole 811 is a hole corresponding to the rod fixing hole 53. The arm portion 81 is fixed to the pedal back surface 52 by inserting a rod connecting screw 85 into the arm hole 811 and the rod fixing hole 53.

The arm recess 812 is provided on one side of the arm portion 81 opposite to a side fixed to the pedal back surface 52. The arm recess 812 is formed by recessing an end of the arm portion 81 on one side opposite to the side fixed to the pedal back surface 52 in the axial direction of the connecting rod 80.

The covering portion recess 813 is provided on a side surface of the arm portion 81. The covering portion recess 813 is formed by recessing the side surface of the arm portion 81 in a direction perpendicular to an axial direction of the connecting rod 80.

The pressing portion 82 includes a contact portion 821 and a pressing convex portion 822, as shown in FIG. 4. The contact portion 821 is in contact with the contact surface 673 of the upper holder 67 in the reaction force generating mechanism 60. The pressing convex portion 822 protrudes from one side of the contact portion 821 opposite to the contact surface 673 in the axial direction of the connecting rod 80. Further, the pressing convex portion 822 is inserted into and fixed to the arm recess 812 by, for example, press fitting. Thereby, the arm portion 81 and the pressing portion 82 are connected.

The covering member 88 is called as a dust boot, and is formed in a cylindrical and bellows-like shape using elastically deformable rubber or the like. The covering member 88 is fitted into the covering recess 813 of the arm portion 81, and expands and contracts in the axial direction of the connecting rod 80 when the connecting rod 80 moves as the pedal 50 rotates. Further, the covering member 88 covers the housing hole 111b, thereby prevents foreign matter from entering into the housing space 115 from the housing hole 111b.

Figure 8:
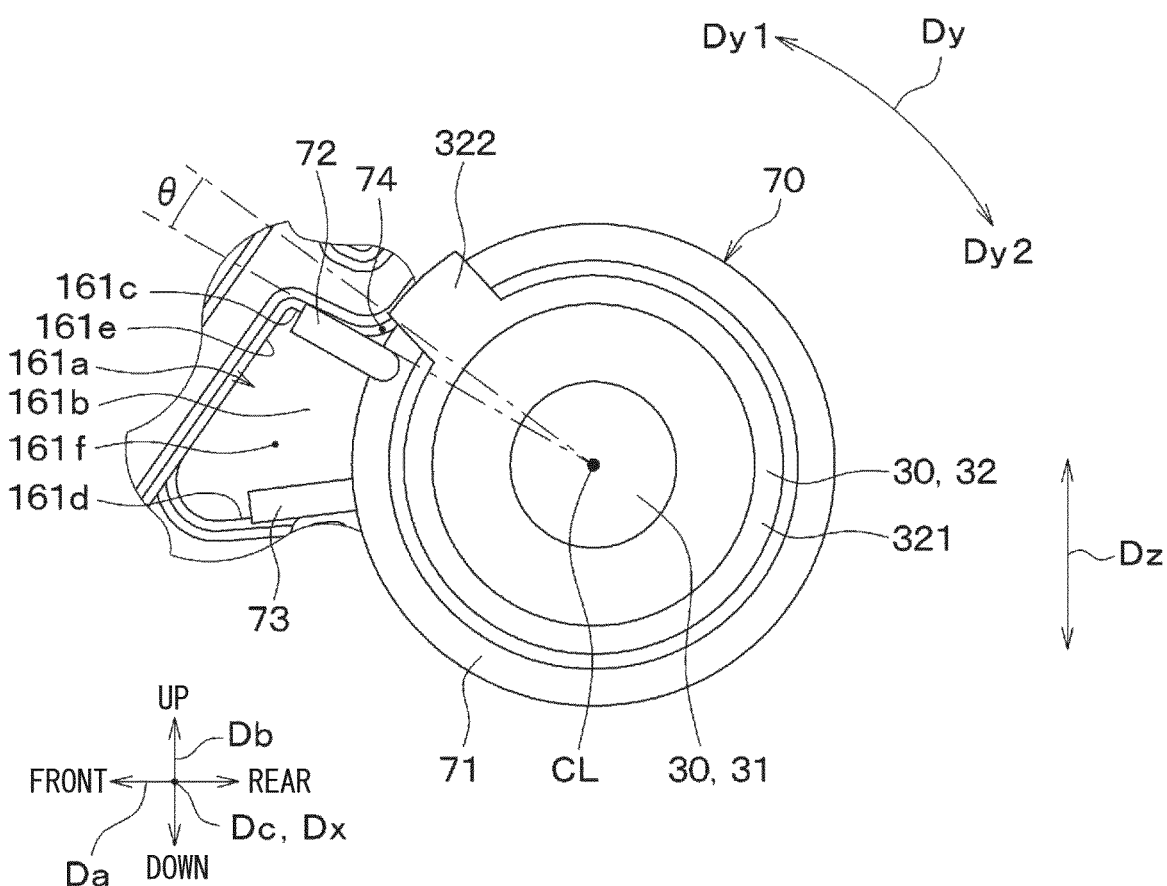
FIG. 8 is a diagram for explaining an operation of the pedal restoring unit according to the first embodiment.
Figure 9:
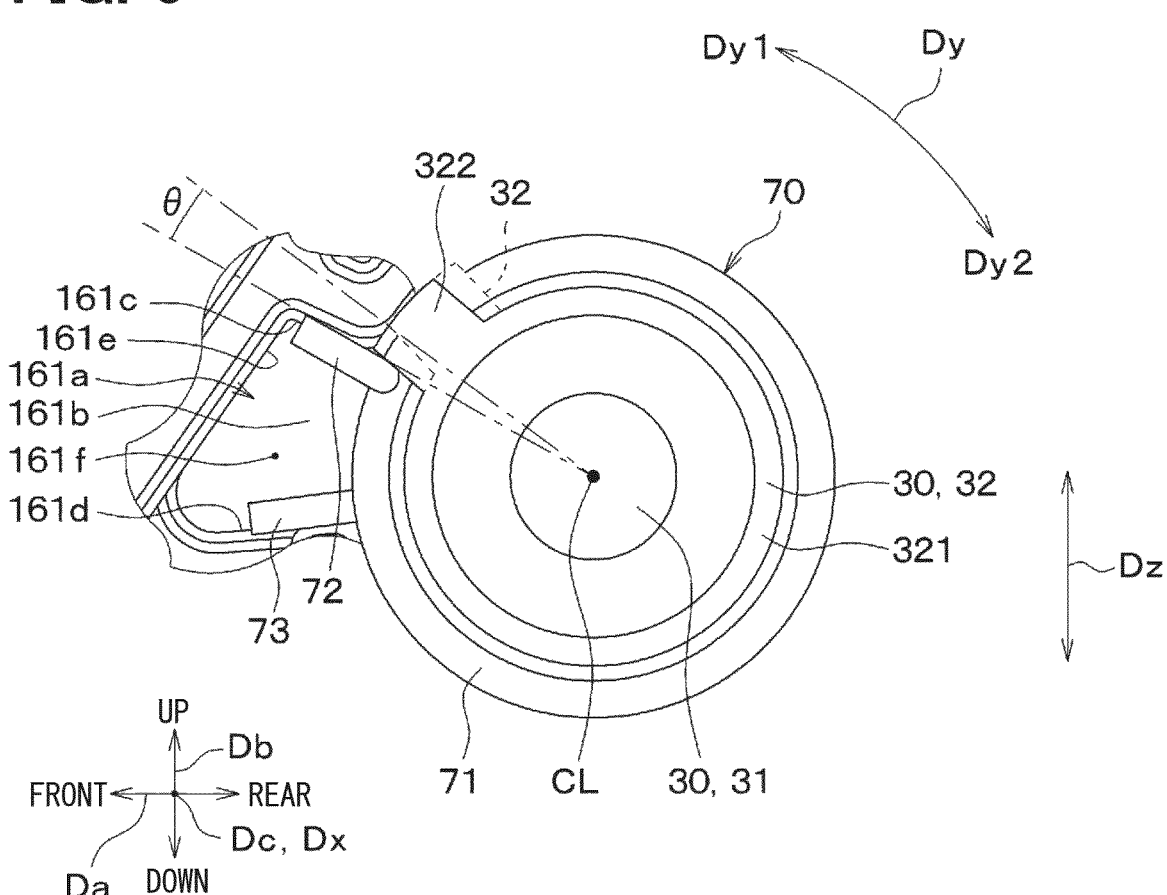
FIG. 9 is a diagram showing a state in which a guide unit according to the first embodiment is in contact with the pedal restoring unit.

Next, the pedal restoring unit 70 will be explained with reference to FIGS. 5 and 8. The pedal restoring unit 70 applies a restoring force to the pedal 50, which rotates the pedal 50 in the second circumferential direction Dy2 and brings the position of the pedal 50 closer to the reference position when the driver's braking operation is released.

As shown in FIG. 5, the pedal restoring unit 70 of the present embodiment is a torsion coil spring having the rotation axis CL as its axis. Specifically, as shown in FIGS. 5 and 8, the pedal restoring unit 70 includes a coil main body 71 wound around the rotation axis CL, and one side end 72 and other side end 73 respectively extending from the coil main body 71. The coil main body 71, the one side end 72, and the other side end 73 are configured as an integrally-molded product.

The coil main body 71 is arranged coaxially with the connecting portion 321 of the shaft 31 and the guide unit 32. Further, the coil main body 71 is formed by being wound around the connecting portion 321 of the guide unit 32. That is, an inner diameter of the coil main body 71 is greater than an outer diameter of the connecting portion 321.

The one side end 72 is continuous to the vehicle left side of the coil main body 71 in the rotation axis direction Dx, that is, to the vehicle left side in the vehicle left-right direction Dc. The one side end 72 protrudes from an end portion of the coil main body 71 on the vehicle left side toward the outside in the rotation axis radial direction Dz. Further, the one side end 72 is supported by the hole first side surface 161c. In such manner, rotation of the one side end 72 of the pedal restoring unit 70 in the second circumferential direction Dy2 is restricted. Further, a part of the one side end 72 is formed at a position that overlaps with the guide stopper 322 in the rotation axis circumferential direction Dy, and also overlaps with the guide stopper 322 in the rotation axis direction Dx.

However, the one side end 72 is not in contact with the guide stopper 322 when the driver's braking operation is released. That is, when the pedal 50 is put at the reference position, the guide stopper 322 of the guide unit 32 that rotates together with the pedal 50 is not in contact with the one side end 72. Specifically, when the pedal 50 is positioned at the reference position, a gap 74 having a predetermined size is provided between the one side end 72 and the guide stopper 322, as shown in FIG. 8.

Further, the one side end 72 is provided at a position where it comes into contact with the stopper 322, when the pedal 50 rotates by a predetermined angle θ or more in the first circumferential direction Dy1 together with the shaft 31 and the guide unit 32 due to the driver's stepping force being applied to the pedal 50. When the pedal 50 rotates from the reference position in the first circumferential direction Dy1 by an angle greater than the predetermined angle θ, the one side end 72 is pressed in the first circumferential direction Dy1 by the guide stopper 322 of the guide unit 32 that rotates together with the pedal 50.

The predetermined angle θ is an angle smaller than an angular range indicating a movable range of the pedal 50, and is set to, for example, one third (⅓) or less of the angular range. Note that the predetermined angle θ may be set to be one fifth (⅕) or less of the angular range indicating the movable range of the pedal 50. The smaller the predetermined angle θ, the smaller the range is made in which the guide stopper 322 is not in contact with the pedal restoring unit 70 when the pedal 50 is rotated from the reference position in the first circumferential direction Dy1.

In other words, the larger the predetermined angle θ is, the greater the range in which the guide stopper 322 and the pedal restoring unit 70 are not in contact with each other when the pedal 50 is rotated from the reference position in the first circumferential direction Dy1. That is, as the predetermined angle θ is increased, the range in which the pedal restoring unit 70 does not generate elastic force can be increased when the pedal 50 rotates in the first circumferential direction Dy1.

The other side end 73 is continuous to the vehicle right side in the rotation axis direction Dx of the coil main body 71, that is, to the right side in the vehicle left-right direction Dc. The other side end 73 protrudes from the end portion of the coil main body 71 on the vehicle right side toward the outside in the rotation axis radial direction Dz. Further, the other side end 73 is supported by the hole second side surface 161d. In such manner, rotation of the other side end 73 of the pedal restoring unit 70 in the first circumferential direction Dy1 is restricted. Further, the other side end 73 is formed at a position, at which (i) a part thereof overlaps with the guide stopper 322 in the rotation axis circumferential direction Dy, and (ii) the entire other side end 73 (as a whole) does not overlap with the guide stopper 322 in the rotation axis direction Dx. That is, the other side end 73 is provided at a position where it does not come into contact with the guide stopper 322 when the shaft 31 rotates together with the guide unit 32 in the first circumferential direction Dy1 due to the driver's stepping force being applied to the pedal 50.

The pedal restoring unit 70 configured in such manner has the one side end 72 supported by the hole first side surface 161c, and the other side end 73 supported by the hole second side surface 161d, and is arranged in a twisted state at a position between the hole first side surface 161c and the hole second side surface 161d. In other words, the pedal restoring unit 70 is fitted into the hole space 161f of the guide hole recess 161a in an elastically deformed state.

Further, when the driver's braking operation is in a released state, the pedal restoring unit 70 is not in contact with the guide stopper 322. Further, even when the pedal 50 rotates from the reference position in the first circumferential direction Dy1, the pedal restoring unit 70 does not come into contact with the guide stopper 322 if the rotation angle of the pedal 50 is smaller than the predetermined angle θ. When the pedal restoring unit 70 does not come into contact with the guide stopper 322, the elastic force generated by twisting the pedal restoring unit 70 is not transmitted to the guide unit 32. Therefore, the elastic force of the pedal restoring unit 70 is not transmitted to the pedal 50 via the guide unit 32 and the shaft 31.

In other words, the pedal restoring unit 70 is configured such that it is incapable for the pedal restoring unit 70 to restore the pedal 50 back to the reference position by the restoring force that the pedal restoring unit 70 itself applies to the pedal 50.

On the other hand, when the pedal 50 rotates from the reference position in the first circumferential direction Dy1 by an angle greater than the predetermined angle θ, the one side end 72 of the pedal restoring unit 70 is configured to be capable of rotating integrally with the guide stopper 322 in the first circumferential direction Dy1. Further, when the pedal 50 rotates from the reference position in the first circumferential direction Dy1 by an angle greater than the predetermined angle θ, the other side end 73 of the pedal restoring unit 70 is configured not to rotate relative to the guide stopper 322.

Therefore, when the pedal 50 rotates by an angle greater than the predetermined angle θ, the pedal restoring unit 70 is elastically deformed in a twisted manner in the rotation axis circumferential direction Dy, by the driver's stepping force transmitted thereto via the guide stopper 322 of the guide unit 32. Thereby, the pedal restoring unit 70 generates an elastic force according to the amount of rotation of the pedal 50. In other words, the pedal restoring unit 70 generates an elastic force according to the change amount when the posture of the pedal 50 changes. Such an elastic force is generated in a direction that rotates the guide unit 32 and the shaft 31 in the second circumferential direction Dy2.

That is, the pedal restoring unit 70 applies a restoring force to the pedal 50 via the shaft 31 to bring the position of the pedal 50 closer to the reference position by elastically deforming in the rotation axis circumferential direction Dy according to the driver's stepping force. Hereinafter, a rotation angle range of the pedal 50 in which a restoring force is applicable from the pedal restoring unit 70 to the pedal 50 may be referred to as a restoring force generation range, and a rotation angle range of the pedal 50 in which a restoring force is not applicable from the pedal restoring unit 70 to the pedal 50 may be referred to as a restoring force non-generation range.

In such manner, when the pedal 50 rotates within the restoring force generation range, the pedal restoring unit 70 applies a restoring force to the pedal 50, using a transmission path that is different from the transmission path of the reaction force applied to the pedal 50 from the reaction force generating mechanism 60, for bring the position of the pedal 50 closer to the reference position. In other words, the pedal restoring unit 70 is provided in parallel with the reaction force generating mechanism 60.

Further, as shown in FIG. 7, the pedal restoring unit 70 is configured such that the restoring force that is applicable to the pedal 50 when the pedal 50 rotates within the restoring force generation range is greater than a load applied to the pedal 50 itself due to its own weight.

Further, the restoring force that the pedal restoring unit 70 applies to the pedal 50 when the pedal 50 rotates within the restoring force generation range is set to be smaller than the reaction force that the reaction force generating mechanism 60 applies to the pedal 50. That is, the restoring force that the pedal restoring unit 70 applies to the pedal 50 when the pedal 50 is positioned at a certain rotational position within the restoring force generation range is smaller than the reaction force that the force generating mechanism 60 applies to the pedal 50 when the pedal 50 is positioned at the certain rotational position described above. In other words, the reaction force generating mechanism 60 applies, to the pedal 50, a reaction force greater than the restoring force applied to the pedal 50 by the pedal restoring unit 70 at any rotational position of the pedal 50 after rotating from the reference position in the first circumferential direction Dy1.

The brake-by-wire system 90 is configured as described above. Next, the operation of the pedal device 1 will be explained.

In the braking operation released state, in which the pedal 50 is not stepped on by the driver, the large-diameter coil spring 62 and the small-diameter coil spring 63 of the reaction force generating mechanism 60 are compressed. At such time, the reaction force of the large-diameter coil spring 62 and the small-diameter coil spring 63 is transmitted to the pedal 50 via the connecting rod 80 connected to the upper holder 67 of the reaction force generating mechanism 60. Such reaction force causes the pedal 50 to rotate in the first circumferential direction Dy1. Further, the opening stopper 23 connected to the pedal 50 via the rotating plate 20 abuts against the first housing 11 at one end of the wall space 113e in the second circumferential direction Dy2. Thereby, when the braking operation is in the released state, the pedal 50 is positioned at the reference position.

By the way, when the pedal 50 is not stepped on by the driver, which causes the braking operation released state, the pedal restoring unit 70 is twisted at a position between the hole first side surface 161c and the hole second side surface 161d. However, the pedal restoring unit 70 is not in contact with the guide stopper 322, thereby not generating any restoring force.

Further, when the driver performs a braking operation by stepping on the pedal 50, the pedal 50 rotates together with the shaft 31 and the rotating plate 20 in the first circumferential direction Dy1 about the rotation axis CL. In such manner, the pedal 50 rotates from the reference position in the first circumferential direction Dy1, i.e., in a direction which brings the position of the pedal 50 closer to the first housing 11.

Then, the sensor unit 40 detects the rotation angle of the pedal 50 by detecting the rotation angle of the shaft 31 that rotates together with the pedal 50. Further, the sensor unit 40 outputs a signal corresponding to the detected rotation angle of the pedal 50 to the first ECU 951 and the second ECU 952.

The first ECU 951 rotates the motor 961b by, for example, supplying electric power to the motor 961b. In such manner, the gear mechanism 961c is driven, thereby moving the master piston 961e. Therefore, the hydraulic pressure of the brake fluid supplied from the reservoir 961a to the master cylinder 961d increases. An increased hydraulic pressure in such manner is supplied to the second brake circuit 962.

Further, the second ECU 952 supplies electric power to a solenoid valve (not shown) of the second brake circuit 962, for example. In such manner, the solenoid valve of the second brake circuit 962 opens. Therefore, the brake fluid supplied to the second brake circuit 962 is supplied to each of the wheel cylinders 91 to 94. Therefore, the brake pads attached to the wheel cylinders 91-94 rub against the corresponding brake discs. Therefore, each wheel is braked, thereby decelerating the vehicle. Note that the second ECU 952 may perform ABS control, VSC control, collision avoidance control, regeneration coordination control, and the like, based on signals from the sensor unit 40 and signals from other electronic control devices (not shown). Note that ABS is an abbreviation for Anti-lock Braking System. Further, VSC is an abbreviation for Vehicle Stability Control.

Further, the connecting rod 80 connected to the pedal 50 rotates together with the pedal 50 about the rotation axis CL. Therefore, the connecting rod 80 is inserted into the housing space 115 from the housing hole 111b. In such manner, the bellows-shaped covering member 88 is compressed.

Further, the pressing portion 82 of the connecting rod 80 presses the upper holder 67 of the reaction force generating mechanism 60, so that the stepping force applied to the pedal 50 is transmitted to the upper holder 67. Thereby, the inner circumferential surface of the holder small-diameter portion 671 slides on the fastening member 64, and the upper holder 67 moves to one side in the coil axis direction Ds1. Then, the small-diameter coil spring 63 is compressed by the holder large-diameter portion 672 of the upper holder 67 in the coil axis direction Ds1. The compressed small-diameter coil spring 63 generates a reaction force corresponding to the stepping force applied to the pedal 50 which has been transmitted thereto via the upper holder 67, and presses the upper holder 67 toward the other side in the coil axis direction Ds1, and presses the spring seat 66 to one side in the coil axis direction Ds1.

Further, when the upper holder 67 moves to one side in the coil axis direction Ds1 and an end of the holder small-diameter portion 671 on the one side in the coil axis direction Ds1 comes into contact with the spring seat small-diameter portion 661 of the spring seat 66, the stepping force applied is also transmitted from the upper holder 67 to the spring seat 66. Thereby, the inner circumferential surface of the spring seat hole 663 slides on the fastening member 64, and the spring seat 66 moves to one side in the coil axis direction Ds1. Then, the large-diameter coil spring 62 is compressed in the coil axis direction Ds1 by the spring seat large-diameter portion 662 of the spring seat 66. The compressed large-diameter coil spring 62 thus presses the spring seat 66 to the other side in the coil axis direction Ds1, and at the same time, presses the lower holder 65 to one side in the coil axis direction Ds1, by generating a reaction force corresponding to the stepping force applied to the pedal 50 which has been transmitted thereto via the spring seat 66.

Further, when the spring seat 66 moves to one side in the coil axis direction Ds1 and the end of the spring seat small-diameter portion 661 on the one side in the coil axis direction Ds1 comes into contact with the lower holder 65, the stepping force applied to the pedal 50 is also transmitted from the spring seat 66 to the lower holder 65. Thereby, the inner circumferential surface of the lower holder hole 651 slides on the fastening member 64, and the lower holder 65 moves to the one side in the coil axis direction Ds1. Thereby, the leaf spring 61 is bent by being pressed by the lower holder 65 that moves to one side in the coil axis direction Ds1. The bent leaf spring 61 generates a reaction force corresponding to the stepping force applied to the pedal 50 which has been transmitted thereto via the lower holder 65, and presses the lower holder 65 to the other side in the coil axis direction Ds1.

In such manner, the reaction force generating mechanism 60 generates a reaction force corresponding to the driver's stepping force applied to the pedal 50, by the reaction force generated from each of the leaf spring 61, the large-diameter coil spring 62, and the small-diameter coil spring 63.

Further, when a braking operation is performed by stepping on the pedal 50 and the pedal 50 rotates from the reference position in the first circumferential direction Dy1, the shaft 31 and the guide unit 32 rotate integrally with the pedal 50 about the rotation axis CL in the first circumferential direction Dy1. However, when the rotation angle of the pedal 50 is within the restoring force non-generation range, the pedal restoring unit 70 is not in contact with the guide unit 32 and therefore does not generate the restoring force.

Figure 10:
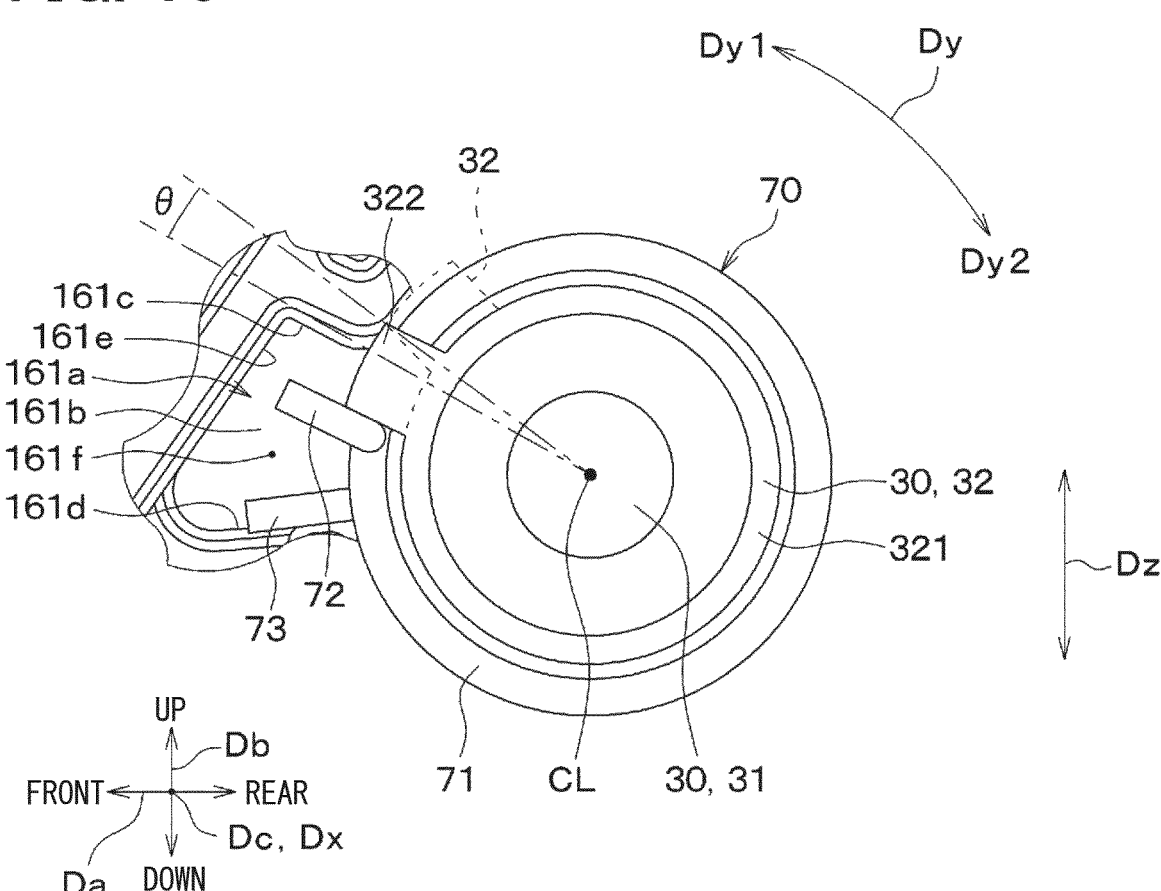
FIG. 10 is a diagram showing a state in which the pedal restoring unit according to the first embodiment is pressed by a guide unit.

Further, when the pedal 50 is rotated by a predetermined angle θ from the reference position in the first circumferential direction Dy1 together with the shaft 31 and the guide unit 32 according to the driver's stepping operation, the guide stopper 322 abuts to the one side end 72 of the pedal restoring unit 70. Then, as shown in FIG. 10, when the pedal 50 rotates from the reference position in the first circumferential direction Dy1 by an angle greater than the predetermined angle θ, the guide stopper 322 presses the one side end 72, thereby transmitting the stepping force being applied to the pedal 50 further to the pedal restoring unit 70. Note that broken lines shown in FIGS. 9 and 10 indicate the position of the guide unit 32 when the pedal 50 is positioned at the reference position.

When the stepping force applied to the pedal 50 is transmitted to the pedal restoring unit 70, the pedal restoring unit 70 is twisted and elastically deformed in the first circumferential direction Dy1. The pedal restoring unit 70, which is being twisted in the first circumferential direction Dy1, generates a restoring force according to the amount of rotation of the pedal 50, and presses the guide stopper 322 in the second circumferential direction Dy2. That is, the pedal restoring unit 70 applies a restoring force to the pedal 50 via the guide unit 32 and the shaft 31 in accordance with the amount of rotation of the pedal 50.

Further, when the pedal 50 rotates from the reference position in the first circumferential direction Dy1, the opening stopper 23 connected to the pedal 50 via the rotating plate 20 rotates in the first circumferential direction Dy1 about the rotation axis CL, and move inside the wall space 113e. Then, as the driver's stepping force increases and the rotation angle of the pedal 50 becomes wider, an upper end of the pedal back surface 52 or its proximity comes into contact with the depression stopper 111c, thereby restricting the rotation of the pedal 50. That is, the rotation angle of the pedal 50 when the depression stopper 111c contacts the pedal back surface 52 is the maximum rotation angle in the movable range of the pedal 50. The maximum rotation angle is also the maximum rotation angle in the restoring force generation range.

Further, when the braking operation is released from a state in which the pedal 50 has rotated from the reference position in the first circumferential direction Dy1, the pedal 50 rotates in the second circumferential direction Dy2 by receiving the reaction force of the reaction force generating mechanism 60 and the restoring force of the pedal restoring unit 70. Further, as the pedal 50 rotates in the second circumferential direction Dy2, the opening stopper 23 rotates together with the pedal 50 in the second circumferential direction Dy2.

Specifically, when the braking operation is released from a state in which the pedal 50 is positioned within the restoring force generation range, the reaction force generating mechanism 60 applies the reaction force to the pedal 50 at all rotational positions from the rotational position where the braking operation is released to the reference position, i.e., all the way back to the reference position.

On the other hand, when the braking operation is released from the state where the pedal 50 is positioned within the restoring force generation range, the pedal restoring unit 70 applies the restoring force to the pedal 50 while the pedal 50 is positioned within the restoring force generation range. Then, the pedal restoring unit 70 does not apply the restoring force to the pedal 50 when the rotation angle of the pedal 50 becomes equal to or less than the predetermined angle θ. In other words, the pedal restoring unit 70 does not apply the restoring force to the pedal 50 when the pedal 50 is positioned within the restoring force non-generation range.

However, as described above, the reaction force generating mechanism 60 is configured to be capable of applying a reaction force to the pedal 50 that is greater than the load required to restore the pedal 50 having been rotated from the reference position and positioned in the first circumferential direction Dy1 back to the reference position. Therefore, even when the braking operation is released from any rotational position of the pedal 50 in the first circumferential direction Dy1 away from the reference position, the pedal 50 is rotated in the second circumferential direction by the reaction force of the reaction force generating mechanism 60, and attempts to rotate in the second circumferential direction Dy2 further through the reference position.

However, the opening stopper 23, which rotates together with the pedal 50, rotates in the second circumferential direction Dy2 about the rotation axis CL, moves within the wall space 113e, and moves to abut against the first housing 11 at an end of the wall space 113e in the second circumferential direction Dy2. In such manner, the pedal 50 is positioned at the reference position with its rotation in the second circumferential direction Dy2 restricted from further rotation through the reference position.

Next, a description will be given of the operation of the pedal device 1 when the reaction force generating mechanism 60 is not capable of applying a reaction force to the pedal 50 and is not capable of supporting the pedal 50 due to a failure of the reaction force generating mechanism 60.

In such case, regardless of whether the brake is operated or not, the pedal 50 tends to rotate from the reference position in the first circumferential direction Dy1 due to its own weight. However, when the braking operation is released from a state where the pedal 50 is positioned within the restoring force generation range, the pedal restoring unit 70 applies, to the pedal 50, a restoring force according to the amount of rotation of the pedal 50 via the guide unit 32 and the shaft 31.

Therefore, even when the braking operation is released in a situation where the pedal 50 is positioned within the restoring force generation range with the reaction force generating mechanism 60 being in a failure state, the pedal 50 is brought closer to the reference position by the restoring force applied from the pedal restoring unit 70. Specifically, according to such a restoring force, the pedal 50 is put at (i.e., is brought to) a position rotated by a predetermined angle θ from the reference position in the first circumferential direction Dy1 by the restoring force.

Further, when the braking operation is released when the pedal 50 is positioned within the restoring force non-generation range, the pedal 50 rotates in the first circumferential direction Dy1 due to its own weight. However, before the pedal 50 rotates from the reference position by an amount further than a predetermined angle θ in the first circumferential direction Dy1, the pedal restoring unit 70 applies a restoring force to the pedal 50 via the guide unit 32 and the shaft 31. Therefore, the pedal 50 is put (i.e., stays) at a position rotated by a predetermined angle θ from the reference position in the first circumferential direction Dy1 by the restoring force.

In such manner, even when the pedal 50 is made to rotate in the first circumferential direction Dy1 due to its own weight in case that the reaction force generating mechanism 60 is in a failure state, the pedal restoring unit 70 is capable of bringing the pedal 50 closer to the reference position.

Further, at such time, the sensor unit 40 detects the rotation angle of the pedal 50 put at a position rotated by a predetermined angle θ from the reference position in the first circumferential direction Dy1, and outputs a signal indicative of the rotation angle of the pedal 50 according to the detected rotation angle of the pedal 50 to the first ECU 951 and the second ECU 952. Then, the first ECU 951 and the second ECU 952 detect a failure of the reaction force generating mechanism 60 based on (i) information regarding the rotation angle of the pedal 50 inputted from the sensor unit 40 and (ii) information regarding an accelerator opening amount inputted from the accelerator sensor.

Specifically, when (i) the pedal 50 is not positioned at the reference position and (ii) the accelerator opening degree is greater than 0 (zero), the first ECU 951 and the second ECU 952 determine that the braking operation and the accelerator operation have been performed simultaneously. In such case, the first ECU 951 and the second ECU 952 determine that the reaction force generating mechanism 60 is in failure.

For example, when the first ECU 951 and the second ECU 952 determine that the reaction force generating mechanism 60 is in failure, the first ECU 951 and the second ECU 952 may be configured to output the determination result to a display device (not shown) provided in the passenger compartment, thereby informing the driver of such determination result. Alternatively, the first ECU 951 and the second ECU 952 may be configured to transmit the determination result to an unillustrated server or cloud outside the vehicle, when determining that the reaction force generating mechanism 60 is in failure. The first ECU 951 and the second ECU 952 of the present embodiment function as a failure detection unit.

As described above, the pedal device 1 of the present embodiment is provided with the pedal 50, which is attached to the housing 10 to be rotatable from the reference position in the first circumferential direction Dy1 by the driver's braking operation, and to be rotatable in the second circumferential direction Dy2 when the braking operation is released. Further, the pedal device 1 is also provided with the reaction force generating mechanism 60 that applies a reaction force against the stepping force to the pedal 50 by elastically deforming when the pedal 50 changes its position from the reference position in the first circumferential direction Dy1 due to the braking operation. The reaction force generating mechanism 60 restores the position of the pedal 50 back to the reference position by a reaction force against the stepping force when the braking operation is released. Further, the pedal device 1 is provided with the pedal restoring unit 70 that applies a restoring force to the pedal 50 to bring it closer to the reference position by rotating the pedal 50 in the second circumferential direction Dy2 when the braking operation is released, by being elastically deformed according to the amount of rotation of the pedal 50.

According to the above, even when the pedal 50 cannot be restored back to the reference position by the reaction force of the reaction force generating mechanism 60 due to a failure of the reaction force generating mechanism 60, the position of the pedal 50 is brought closer to the reference position by the pedal restoring unit 70.

Further, according to the embodiment described above, it is possible to achieve the following advantageous effects.

(1) In the above-described embodiment, the reaction force generating mechanism 60 applies a reaction force greater than the restoring force that the pedal restoring unit 70 applies to the pedal 50 when the pedal 50 changes its position from the reference position in the first circumferential direction Dy1.

By configuring the reaction force generating mechanism 60 so that the reaction force generated when the pedal 50 changes its position from the reference position in the first circumferential direction Dy1 is greater than the restoring force, it is made easier for the driver to feel a decrease of the reaction force generated for the pedal 50 when the reaction force generating mechanism 60 has failed. In such manner, it is easier for the driver to detect a failure of the reaction force generating mechanism 60.

(2) In the embodiment described above, the pedal device 1 includes the sensor unit 40 that detects information regarding the rotation angle of the pedal 50. Further, the pedal restoring unit 70 is set so that it is incapable for the pedal restoring unit 70 to restore the pedal 50 back to the reference position by the restoring force applied therefrom to the pedal 50.

According to the above, when the reaction force generating mechanism 60 has failed, the pedal restoring unit 70 cannot restore the pedal 50 back to the reference position. That is, when the reaction force generating mechanism 60 is in failure, the pedal 50 is put at a position away from the reference position in the first circumferential direction Dy1.

Further, the sensor unit 40 can detect the rotation angle of the pedal 50 positioned away from the reference position in the first circumferential direction Dy1.

Therefore, for example, by transmitting, to the first ECU 951 and the second ECU 952, information on the rotation angle of the pedal 50 positioned away from the reference position in the first circumferential direction Dy1, the first ECU 951 and the second ECU 952 are enabled to detect a failure of the reaction force generating mechanism 60.

(3) In the embodiment described above, the pedal restoring unit 70 generates a restoring force according to the amount of rotation when the pedal 50 rotates from the reference position in the first circumferential direction Dy1 by an angle greater than the predetermined angle θ.

According to the above, the pedal restoring unit 70 cannot apply a restoring force to the pedal 50 in a state where the pedal 50 is rotated by a predetermined angle θ or less from the reference position in the first circumferential direction Dy1. Therefore, when the reaction force generating mechanism 60 is in failure, the pedal restoring unit 70 cannot restore the pedal 50 back to the reference position. By configuring the pedal restoring unit 70 in such manner, it is possible to easily realize a configuration in which the pedal 50 cannot be restored back to the reference position when the reaction force generating mechanism 60 is in failure.

(4) In the embodiment described above, the pedal device 1 includes the shaft 31 that rotates together with the pedal 50 about the rotation axis CL when the brake is operated. Further, the pedal 50 is configured to be rotatable together with the shaft 31 in the first circumferential direction Dy1 and in the second circumferential direction Dy2. Further, the pedal restoring unit 70 is provided on the shaft 31 to be elastically deformable by the rotational force generated when the shaft 31 rotates in the first circumferential direction Dy1. Further, the pedal restoring unit 70 generates a restoring force that rotates the pedal 50 in the second circumferential direction Dy2 using the elastic force generated when the shaft 31 rotates in the first circumferential direction Dy1.

According to the above, in the pedal device 1 having the shaft 31 that rotates integrally with the pedal 50, the pedal restoring unit 70 that generates the restoring force by the rotational force of the shaft 31 can be realized with a simple configuration.

(5) In the embodiment described above, the pedal restoring unit 70 is a coil spring wound around the guide unit 32, and generates a restoring force that rotates the pedal 50 in the second circumferential direction Dy2, by being twisted and elastically deformed when the guide unit 32 rotates in the first circumferential direction Dy1.

According to the above, the pedal restoring unit 70 can be easily obtained by configuring the pedal restoring unit 70 as the coil spring wound around the guide unit 32.

(6) In the embodiment described above, the rotating member 30 includes the shaft 31 that rotates about the rotation axis CL, and the guide unit 32 that is attached to the shaft 31 and transmits the rotational force of the shaft 31 to the pedal restoring unit 70.

According to the above, by providing, separately from the shaft 31, a member that transmits the rotational force of the shaft 31 to the pedal restoring unit 70, a shape of the shaft 31 is made simplified, compared to a configuration which transmits the rotational force of the shaft 31 directly to the pedal restoring unit 70.

(7) In the embodiment described above, the pedal restoring unit 70 is housed inside the housing 10.

According to the above, since the pedal restoring unit 70 is not exposed to the outside, it is possible to suppress intrusion of foreign matter and the application of external force from the outside.

Modification of First Embodiment

In the first embodiment described above, an explanation is given to a case in which the pedal restoring unit 70 generates a restoring force according to the amount of rotation when the pedal 50 rotates from the reference position in the first circumferential direction Dy1 by an angle greater than the predetermined angle θ. However, the present disclosure is not limited to such an example. The pedal restoring unit 70 may be configured to generate a restoring force at any rotational position when the pedal 50 rotates from the reference position in the first circumferential direction Dy1.

Second Embodiment

Next, the second embodiment of the present disclosure will be described with reference to FIGS. 11 and 12. The present embodiment is different from the first embodiment in that a pedal restoring unit 70 is supported by a guide unit 32 when a pedal 50 is positioned at the reference position. In the present embodiment, the different portions from the first embodiment are mainly described, and descriptions of portions similar to the first embodiment may be omitted.

Unlike the first embodiment, one side end 72 of the present embodiment protrudes toward the vehicle left side from an end portion of a coil main body 71 on the vehicle left side. That is, the one side end 72 protrudes in a direction perpendicular to the direction in which an other side end 73 protrudes and to the rotation axis radial direction Dz.

Further, unlike the first embodiment, the one side end 72 does not contact the hole first side surface 161*c*. That is, in the pedal restoring unit 70 of the present embodiment, the one side end 72 is not supported by the hole first side surface 161*c*.

Figures 11, 12:
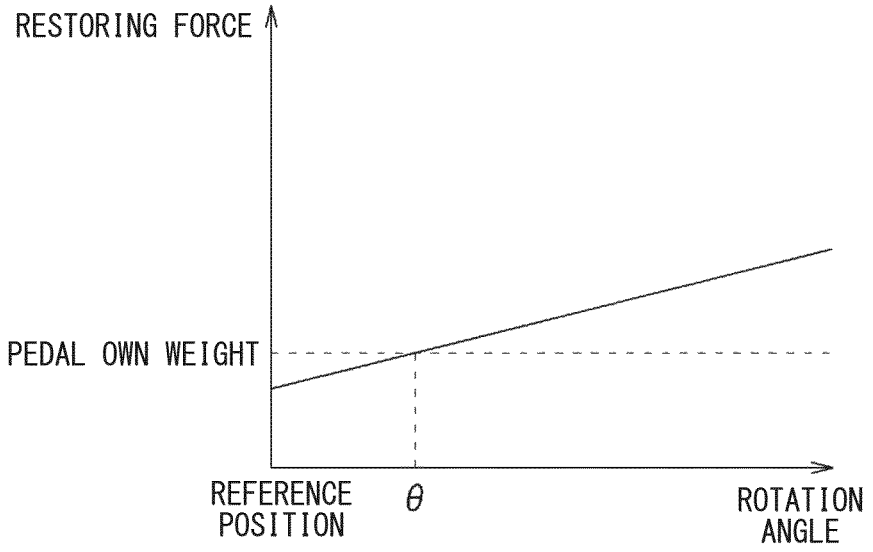
FIG. 11 is a diagram of a pedal device according to a second embodiment, corresponding to FIG. 6.
FIG. 12 is a diagram showing a relationship between a rotation angle of the pedal and the restoring force in the pedal restoring unit according to the second embodiment.

Instead, the one side end 72 of the present embodiment is supported by a guide stopper 322, as shown in FIG. 11. Specifically, a portion of the one side end 72 in the second circumferential direction Dy2 is supported by a portion of the guide stopper 322 in the first circumferential direction Dy1. In such manner, rotation of the one side end 72 of the pedal restoring unit 70 in the second circumferential direction Dy2 is restricted.

Further, the one side end 72 comes into contact with the guide stopper 322 when the driver's braking operation is released. That is, when the pedal 50 is positioned at the reference position, the guide stopper 322 of the guide unit 32 comes into contact with the one side end 72.

Further, the pedal restoring unit 70 has the one side end 72 supported by the guide stopper 322 and the other side end 73 supported by the hole second side surface 161*d*, and is arranged at a position between the guide stopper 322 and the hole second side surface 161*d* in a twisted state.

The pedal restoring unit 70 configured in such manner generates an elastic force applicable to the guide unit 32, even when the pedal 50 is positioned at any rotational position within the movable range.

Further, the pedal restoring unit 70 is configured to be further twisted in the rotation axis circumferential direction Dy by the driver's stepping force applied to the pedal 50 and transmitted thereto via the guide stopper 322 of the guide unit 32, when the pedal 50 rotates from the reference position in the first circumferential direction Dy1. Thereby, the pedal restoring unit 70 applies a restoring force to the pedal 50 according to the amount of rotation of the pedal 50.

However, just like the first embodiment, the pedal restoring unit 70 in the present embodiment is set so that it is incapable for the pedal restoring unit 70 to restore the pedal 50 back to the reference position by the restoring force applied therefrom to the pedal 50.

Specifically, as shown in FIG. 12, when the rotation angle of the pedal 50 is smaller than the predetermined angle θ, the pedal restoring unit 70 causes the restoring force that is applicable to the pedal 50 is smaller than the load applied to the pedal 50 by the own weight of the pedal 50 itself. For example, the pedal restoring unit 70 may be set to have a smaller restoring force than the own weight of the pedal 50 itself when the rotation angle of the pedal 50 is smaller than the predetermined angle θ, depending on an amount of twist of the pedal restoring unit 70 when the pedal restoring unit 70 is arranged at the position between the guide stopper 322 and the hole second side surface 161d in a twisted state.

Further, the pedal restoring unit 70 is configured such that, when the rotation angle of the pedal 50 is equal to or greater than the predetermined angle θ, the restoring force that is applicable to the pedal 50 is equal to or greater than the load applied to the pedal 50 itself by its own weight.

For example, the pedal restoring unit 70 may be set to have a restoring force equal to or greater than the own weight of the pedal 50 itself when the rotation angle of the pedal 50 is equal to or greater than the predetermined angle θ, depending an amount of twist of the pedal restoring unit 70 when the pedal restoring unit 70 is arranged at the position between the guide stopper 322 and the hole second side surface 161d in a twisted state. Further, an elastic coefficient of the pedal restoring unit 70 may be set such that the restoring force when the rotation angle of the pedal 50 is equal to or greater than the predetermined angle θ is equal to or greater than the own weight of the pedal 50 itself.

According to the configuration described above, even when the pedal 50 cannot be restored back to the reference position by the reaction force of the reaction force generating mechanism 60 due to a failure of the reaction force generating mechanism 60, the pedal restoring unit 70 can bring the position of the pedal 50 closer to the reference position.

Further, according to the embodiment described above, it is possible to achieve the following advantageous effects.

(1) In the embodiment described above, when the rotation angle of the pedal 50 is smaller than the predetermined angle θ, the elastic coefficient of the pedal restoring unit 70 is set so that the restoring force applicable from the pedal restoring unit 70 is smaller than the load applied to the pedal 50 by the own weight of the pedal 50 itself.

According to the above, when the reaction force generating mechanism 60 is in failure, it is incapable for the pedal restoring unit 70 in a state where the pedal 50 is rotated by the predetermined angle θ or less from the reference position in the first circumferential direction Dy1 to apply the restoring force to the pedal 50 to restore the pedal 50 back to the reference position. Further, by setting the elastic coefficient of the pedal restoring unit 70 in such manner, it is possible to easily realize a configuration in which the pedal 50 is not restored back to the reference position when the reaction force generating mechanism 60 is in failure.

Modification of Second Embodiment

In the second embodiment described above, an example in which the pedal restoring unit has the elastic coefficient in such a setting that, when the rotation angle of the pedal 50 is smaller than the predetermined angle θ, the restoring force applicable therefrom to the pedal 50 is smaller than the load applied to the pedal 50 itself has been described. However, the present disclosure is not limited thereto. For example, the pedal restoring unit 70 may have an elastic coefficient set such that a restoring force greater than the load applied to the pedal 50 itself when the pedal 50 is positioned at the reference position is applicable to the pedal 50.

Third Embodiment

Figure 13:
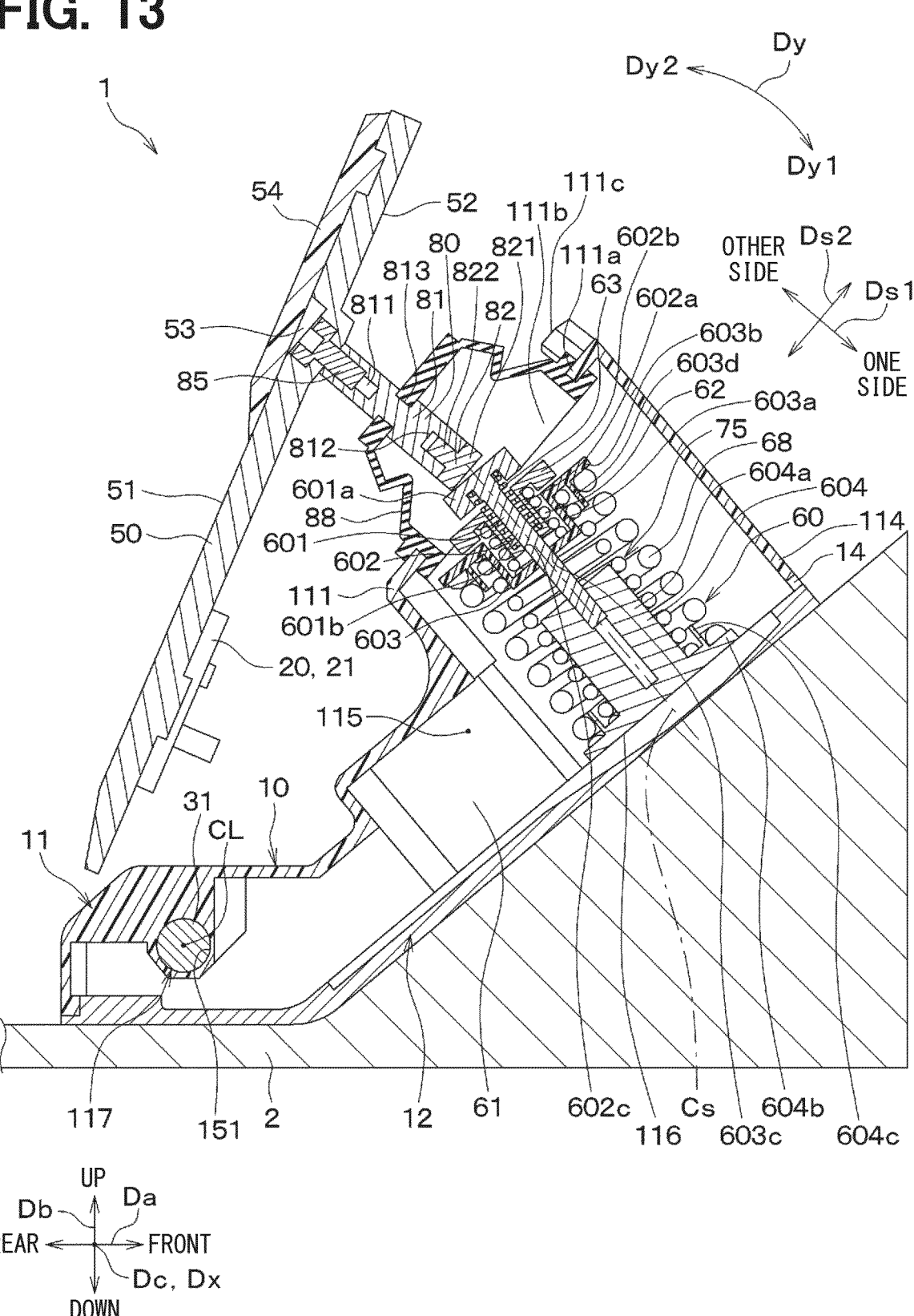
FIG. 13 is a diagram of a pedal device according to a third embodiment, corresponding to FIG. 4.

Next, the third embodiment will be described with reference to FIGS. 13 and 14. In the present embodiment, the structure of the reaction force generating mechanism 60 is different from the first embodiment. Further, in the present embodiment, an elastic member 75 is provided in place of the pedal restoring unit 70. In the present embodiment, the different portions from the first embodiment are mainly described, and descriptions of portions similar to the first embodiment may be omitted.

First, the elastic member 75 will be explained with reference to FIG. 13. Unlike the first embodiment, the elastic member 75 is configured of a compression coil spring having the coil axis Cs as its axis, as shown in FIG. 13. The elastic member 75 is formed by being wound around the coil axis Cs.

Further, the elastic member 75 is housed inside a housing 10. Specifically, the elastic member 75 is housed inside the reaction force generating mechanism 60 in a compressed state. Further, the elastic member 75 is configured such that, when the reaction force generating mechanism 60 generates a reaction force due to the driver's stepping force applied to the pedal 50, the elastic member 75 itself can also generate a restoring force.

More specifically, the elastic member 75 generates a restoring force by elastically deforming in the coil axis direction Ds1 as the pedal 50 rotates from the reference position in the first circumferential direction Dy1. Then, at a time when the driver's braking operation is released, the elastic member 75 applies a restoring force to the pedal 50 to rotate the pedal 50 in the second circumferential direction Dy2 and to bring the position of the pedal 50 closer to the reference position.

Figure 14:
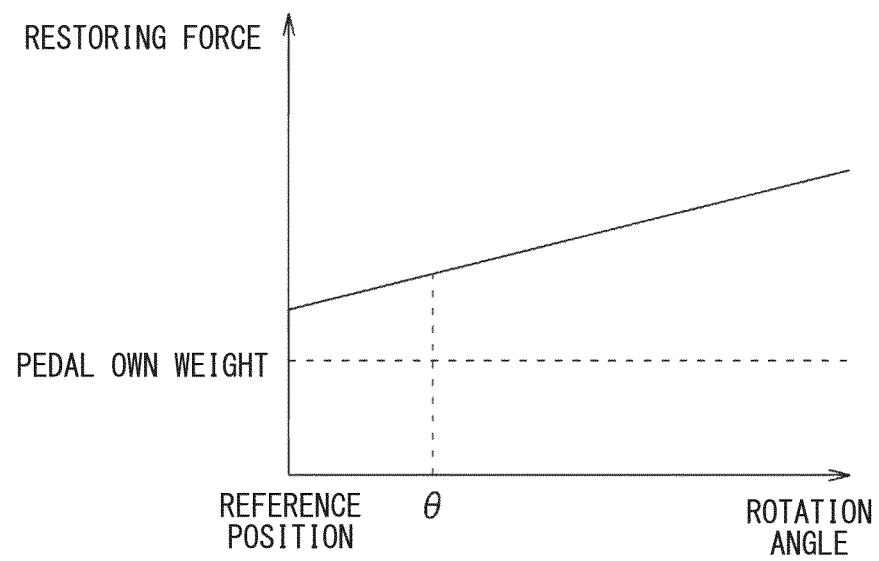
FIG. 14 is a diagram showing a relationship between the rotation angle of the pedal and the restoring force in an elastic member according to the third embodiment.

As shown in FIG. 14, the elastic member 75 is configured such that the restoring force that is applicable to the pedal 50 is greater than the load applied to the pedal 50 itself by the own weight of the pedal 50 at any rotational position when the pedal 50 rotates from the reference position in the first circumferential direction Dy1. In other words, the elastic member 75 is configured such that the restoring force generated in accordance with the amount of rotation of the pedal 50 is equal to or greater than the load required to restore the pedal 50 back to the reference position even when the reaction force generating mechanism 60 is in failure.

For example, the amount of compression of the elastic member 75 when compressed inside the reaction force generating mechanism 60 may be set so that the restoring force generated therefrom when the pedal 50 is positioned at the reference position is greater than the own weight of the pedal 50. The elastic member 75 of the present embodiment functions as the pedal restoring unit 70 of the first embodiment.

Next, the reaction force generating mechanism 60 of the present embodiment will be explained. In the reaction force generating mechanism 60 of the present embodiment, the leaf spring 61 is eliminated compared to the first embodiment, and a main coil spring 68 is provided in place of the leaf spring 61. Further, the reaction force generating mechanism 60 also includes a connecting portion 601 for connecting the main coil spring 68, a large-diameter coil spring 62, and a small-diameter coil spring 63, together with a first holder 602, a second holder 603, and a third holder 604.

The main coil spring 68, just like the large-diameter coil spring 62 and the small-diameter coil spring 63, is a compression coil spring whose axis is set as the coil axis Cs. The main coil spring 68 is formed by being wound around the coil axis Cs. Further, an inner diameter of the main coil spring 68 is greater than an outer diameter of each of the large-diameter coil spring 62 and the small-diameter coil spring 63. Further, the inner diameter of the main coil spring 68 is greater than an outer diameter of the elastic member 75.

The main coil spring 68 generates elastic force by being elastically deformed in the coil axis direction Ds1 by the driver's stepping force applied to the pedal 50. In the present embodiment, the main coil spring 68 functions as a reaction force generating unit.

The connecting portion 601 is a component having a cylindrical shape extending in the coil axis direction Ds1, and transmits the driver's stepping force transmitted via the connecting rod 80 to the main coil spring 68, the large-diameter coil spring 62, the small-diameter coil spring 63, and the elastic member 75.

The connecting portion 601 is made of metal and is formed in a rod shape. Specifically, the connecting portion 601 includes a load receiving portion 601a in contact with the connecting rod 80, and a column portion 601b extending from one side of the load receiving portion 601a in the coil axis direction Ds1 to the other side in the coil axis direction Ds1. A small-diameter coil spring 63 is connected to one side of the load receiving portion 601a in the coil axis direction Ds1. The column portion 601b is provided to penetrate inside the small-diameter coil spring 63. The small-diameter coil spring 63 is supported by the load receiving portion 601a on the other side in the coil axis direction Ds1, and is supported by the first holder 602 on one side in the coil axis direction Ds1.

The small-diameter coil spring 63 is arranged in a compressed state at a position between the connecting portion 601 and the first holder 602.

The first holder 602 is a member that supports the small-diameter coil spring 63 and the large-diameter coil spring 62. Specifically, the first holder 602 supports one side of the small-diameter coil spring 63 in the coil axis direction Ds1, and supports the other side of the large-diameter coil spring 62 in the coil axis direction Ds1. The first holder 602 has a first small-diameter portion 602a and a first large-diameter portion 602b.

The first small-diameter portion 602a is formed in a bottomed-cylindrical shape having a bottom on one side in the coil axis direction Ds1. Further, an inner diameter of the first small-diameter portion 602a is greater than an outer diameter of the small-diameter coil spring 63. The first small-diameter portion 602a houses a portion of the small-diameter coil spring 63 in an inner space.

Further, an outer diameter of the first small-diameter portion 602a is smaller than an inner diameter of the large-diameter coil spring 62. The first small-diameter portion 602a is arranged in a space inside the large-diameter coil spring 62. Further, the size of the first small-diameter portion 602a in the coil axis direction Ds1 is smaller than the size of each of the small-diameter coil spring 63 and the large-diameter coil spring 62 in the coil axis direction Ds1.

A first holder hole 602c penetrating in the coil axis direction Ds1 is formed approximately at the center of the bottom of the first small-diameter portion 602a. The first holder 602 is connected to the connecting portion 601 by inserting the column portion 601b into the first holder hole 602c.

The first large-diameter portion 602b is connected to one side opposite to the bottom side of the first small-diameter portion 602a, and extends in a thin plate shape from the other side of the first small-diameter portion 602a in the coil axis direction Ds1 to the outside in the coil radial direction Ds2. An outer diameter of the first large-diameter portion 602b is greater than the outer diameter of the first small-diameter portion 602a.

Further, the outer diameter of the first large-diameter portion 602b is greater than the outer diameter of the large-diameter coil spring 62. The first large-diameter portion 602b has a surface on one side in the coil axis direction Ds1 supporting the other side of the large-diameter coil spring 62 in the coil axis direction Ds1. Thereby, the first holder 602 and the large-diameter coil spring 62 are connected.

The large-diameter coil spring 62 is supported by a first holder 602 on the other side in the coil axis direction Ds1, and is supported by the second holder 603 on one side in the coil axis direction Ds1. The large-diameter coil spring 62 is arranged at a position between the first holder 602 and the second holder 603 in a compressed state. Further, the large-diameter coil spring 62 overlaps with a portion of the small-diameter coil spring 63 housed in the first small-diameter portion 602a in the coil radial direction Ds2.

The second holder 603 is a member that supports the large-diameter coil spring 62, the main coil spring 68, and the elastic member 75. Specifically, the second holder 603 supports one side of the large-diameter coil spring 62 in the coil axis direction Ds1, and supports the other side of each of the main coil spring 68 and the elastic member 75 in the coil axis direction Ds1. The second holder 603 has a second small-diameter portion 603a and a second large-diameter portion 603b.

The second small-diameter portion 603a is formed in a bottomed-cylindrical shape having a bottom on one side in the coil axis direction Ds1. Further, an inner diameter of the second small-diameter portion 603a is greater than the outer diameter of the large-diameter coil spring 62. The second small-diameter portion 603a houses a portion of the large-diameter coil spring 62 in the inner space.

Further, the outer diameter of the second small-diameter portion 603a is smaller than the inner diameter of each of the main coil spring 68 and the elastic member 75. The second small-diameter portion 603a is arranged in a space inside each of the main coil spring 68 and the elastic member 75. Further, the size of the second small-diameter portion 603a in the coil axis direction Ds1 is smaller than the size of each of the large-diameter coil spring 62, the main coil spring 68, and the elastic member 75 in the coil axis direction Ds1.

A second holder hole 603c penetrating in the coil axis direction Ds1 is formed approximately at the center on the bottom side of the second small-diameter portion 603a. The second holder 603 is connected to the connecting portion 601 by inserting the column portion 601b into the second holder hole 603c.

The second large-diameter portion 603b is connected to one side opposite to the bottom side of the second small-diameter portion 603a, and extends in a thin plate shape from the other side of the second small-diameter portion 603a in the coil axis direction Ds1 to the outside in the coil radial direction Ds2. An outer diameter of the second large-diameter portion 603b is greater than the outer diameter of the second small-diameter portion 603a.

Further, the outer diameter of the second large-diameter portion 603b is greater than the outer diameter of each of the main coil spring 68 and the elastic member 75. Further, the second large-diameter portion 603b has a second holder rib 603d that protrudes from a surface on one side in the coil axis direction Ds1 toward the one side in the coil axis direction Ds1. The second holder rib 603d is formed in an annular shape on a surface of the second large-diameter portion 603b on the one side in the coil axis direction Ds1.

In the second large-diameter portion 603b, a portion thereof on an outer side in the coil radial direction Ds2 than the second holder rib 603d on a surface thereof on the one side in the coil axis direction Ds1 supports the other side of the main coil spring 68 in the coil axis direction Ds1. Further, in the second large-diameter portion 603b, a portion thereof on an inner side in the coil radial direction Dy2 than the second holder rib 603d on a surface thereof on the one side in the coil axis direction Ds1 supports the other side of the elastic member 75 in the coil axis direction Ds1. Thereby, the second holder 603 is connected to the large-diameter coil spring 62 and the elastic member 75, respectively.

The main coil spring 68 is supported by the second holder 603 on the other side in the coil axis direction Ds1, and is supported by the third holder 604 on the one side in the coil axis direction Ds1. The main coil spring 68 is arranged at a position between the second holder 603 and the third holder 604 in a compressed state. Further, the main coil spring 68 overlaps with a portion of the large-diameter coil spring 62 housed in the second small-diameter portion 603a in the coil radial direction Ds2.

The elastic member 75 is supported by the second holder 603 on the other side in the coil axis direction Ds1, and is supported by the third holder 604 on one side in the coil axis direction Ds1. The elastic member 75 is arranged at a position between the second holder 603 and the third holder 604 in a compressed state. Further, the elastic member 75 overlaps with a portion of the large-diameter coil spring 62 housed in the second small-diameter portion 603a in the coil radial direction Ds2.

Further, the elastic member 75 overlaps with the main coil spring 68 in the coil radial direction Ds2. That is, the elastic member 75 and the main coil spring 68 are formed to have the same size in the coil axis direction Ds1. The elastic member 75 is arranged in a space inside the main coil spring 68.

The third holder 604 is a member that supports the main coil spring 68 and the elastic member 75. Specifically, the third holder 604 has a third small-diameter portion 604a and a third large-diameter portion 604b. The third small-diameter portion 604a is formed in a cylindrical shape. Further, an outer diameter of the third small-diameter portion 604a is smaller than the inner diameter of the main coil spring 68 and the elastic member 75. The third small-diameter portion 604a is arranged in a space inside the main coil spring 68 and the elastic member 75.

Further, the size of the third small-diameter portion 604a in the coil axis direction Ds1 is smaller than the size of each of the main coil spring 68 and the elastic member 75 in the coil axis direction Ds1. Further, the column portion 601b is inserted into an inner space of the third small-diameter portion 604a.

When the main coil spring 68, the large-diameter coil spring 62, the small-diameter coil spring 63, and the elastic member 75 are elastically deformed in the coil axis direction Ds1 by the driver's stepping force, the column portion 601b slides on an inner circumferential surface of the first holder hole 602c. Further, the column portion 601b also slides on an inner circumferential surface of the second holder hole 603c and an inner circumferential surface of the third small-diameter portion 604a.

The third large-diameter portion 604b is connected to one side of the third small-diameter portion 604a in the coil axis direction Ds1, and is formed in a thin disk shape that closes the third small-diameter portion 604a. An outer diameter of the third large-diameter portion 604b is greater than the outer diameter of the third small-diameter portion 604a.

Further, the third large-diameter portion 604b has a third holder rib 604c that protrudes from a surface on the other side in the coil axis direction Ds1 toward the other side in the coil axis direction Ds1. The third holder rib 604c is formed in an annular shape on a surface on the other side of the third large-diameter portion 604b in the coil axis direction Ds1. Further, the third holder rib 604c faces the second holder rib 603d in the coil axis direction Ds1.

The third large-diameter portion 604b has a portion outside the third holder rib 604c in the coil radial direction Ds2 on the surface on the other side in the coil axis direction Ds1 supporting one side of the main coil spring 68 in the coil axis direction Ds1. Further, the second large-diameter portion 603b has a portion on a surface on the other side in the coil axis direction Ds1, which is located inside the third holder rib 604c in the coil radial direction Ds2, supporting the elastic member 75. In such manner, the main coil spring 68 and the elastic member 75 are connected to the third holder 604.

Further, the third large-diameter portion 604b is fixed to the second housing 12 at one side in the coil axis direction Ds1. Thereby, the reaction force generating mechanism 60 is supported by the second housing 12.

Further, the main coil spring 68, the elastic member 75, the large-diameter coil spring 62, the small-diameter coil spring 63, the first holder 602, the second holder 603, and the third holder 604 are connected to each other via the connecting portion 601.

The main coil spring 68, the large-diameter coil spring 62, and the small-diameter coil spring 63 are connected in such order from one side to the other side in the coil axis direction Ds1 at a position between the pedal 50 and the second housing 12. Further, the elastic member 75, the large-diameter coil spring 62, and the small-diameter coil spring 63 are also connected in such order from one side to the other side in the coil axis direction Ds1 at a position between the pedal 50 and the second housing 12.

In such manner, the main coil spring 68 is connected in series to the large-diameter coil spring 62 and the small-diameter coil spring 63 along the coil axis direction Ds1. Further, the elastic member 75 is also connected in series to the large-diameter coil spring 62 and the small-diameter coil spring 63 along the coil axis direction Ds1. Further, the driver's stepping force applied to the pedal 50 is transmitted to the main coil spring 68 and the elastic member 75 via the large-diameter coil spring 62 and the small-diameter coil spring 63.

Further, the main coil spring 68 and the elastic member 75 generate an elastic force by the driver's stepping force transmitted via the large-diameter coil spring 62 and the small-diameter coil spring 63, and respectively apply the elastic force independently to the pedal 50. That is, the main coil spring 68 and the elastic member 75 apply elastic force to the pedal 50 to bring the position of the pedal 50 closer to the reference position through different transmission paths. In other words, the elastic member 75 is provided in parallel with the main coil spring 68 that functions as a reaction force generating unit.

In addition, the reaction force generating mechanism 60 is set such that a total of the elastic forces generated by elastic deformation of the main coil spring 68, the large-diameter coil spring 62, and the small-diameter coil spring 63 is equal to or greater than the load that is required for restoring the pedal 50 back to the reference position. That is, the reaction force generating mechanism 60 is configured to be capable of applying a reaction force to the pedal 50 which is equal to or greater than the load required to restore the pedal 50, which is movably positioned away from the reference position in the first circumferential direction Dy1, back to the reference position.

According to the configuration described above, even when the pedal 50 cannot be restored back to the reference position by the reaction force of the reaction force generating mechanism 60 due to a failure of the reaction force generating mechanism 60, the elastic member 75 can move the position of the pedal 50 closer to the reference position.

Further, in the elastic member 75 of the present embodiment, the restoring force generated in accordance with the amount of rotation of the pedal 50 is set to be greater than the load required to restore the pedal 50 back to the reference position. Therefore, even when the pedal 50 cannot be restored back to the reference position by the reaction force of the reaction force generating mechanism 60 due to a failure of the reaction force generating mechanism 60, the position of the pedal 50 is restored back to the reference position by using the elastic member 75.

Fourth Embodiment

Next, the fourth embodiment will be described with reference to FIG. 15. The present embodiment differs from the first embodiment in that the pedal restoring unit 70 is replaced with an elastic member 75 in the third embodiment. However, the position where the elastic member 75 is provided is different from the third embodiment. In the present embodiment, configuration different from the first embodiment and the third embodiment will be mainly described, and the configuration similar to the first embodiment or the third embodiment may be omitted.

Figure 15:
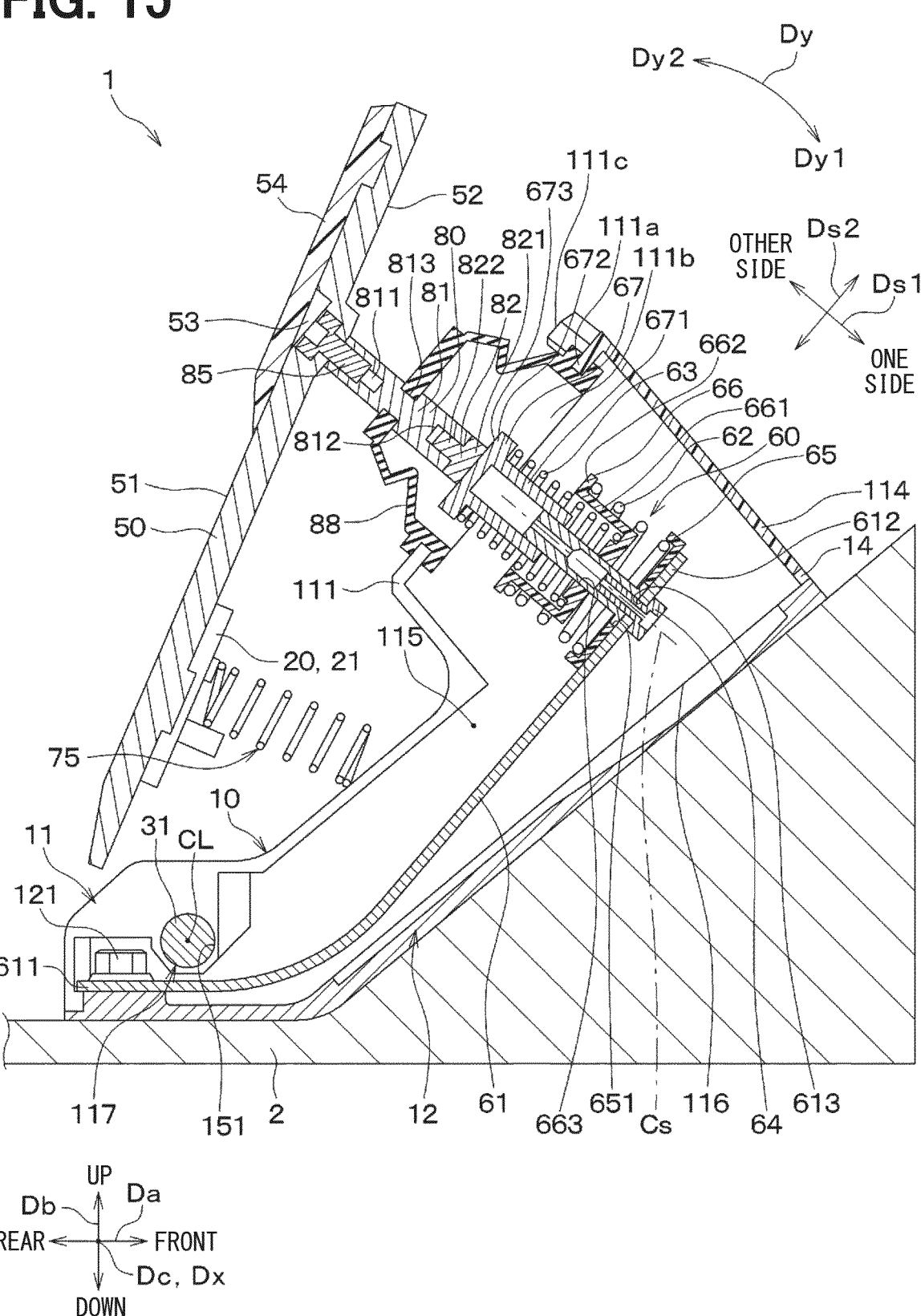
FIG. 15 is a diagram of a pedal device according to a fourth embodiment, corresponding to FIG. 4.

As shown in FIG. 15, an elastic member 75 of the present embodiment is composed of a compression coil spring and is attached to a pedal 50 via a rotating plate 20. Specifically, one side of the elastic member 75 in a compression direction is connected to a surface of a back plate part 21 of the rotating plate 20 that is opposite to another surface to which the pedal 50 is fixed. The other side of the elastic member 75 in the compression direction is connected to the surface of an upper wall 111 of a first housing 11 that faces a pedal back surface 52. That is, the elastic member 75 of the present embodiment is provided at a position between the rotating plate 20 and a housing 10. Therefore, the elastic member 75 of the present embodiment is not housed inside the housing 10.

Then, as the pedal 50 rotates from the reference position in the first circumferential direction Dy1, the elastic member 75 is pressed by the rotating plate 20 and elastically deforms, thereby generating a restoring force. Then, the elastic member 75 applies a restoring force to rotate the pedal 50 in the second circumferential direction Dy2 and to bring the position of the pedal 50 closer to the reference position via the rotating plate 20, when the driver's braking operation is released.

The elastic member 75 configured in such manner applies a restoring force to the pedal 50 to bring the position of the pedal 50 closer to the reference position through a force transmission path different from a force transmission path of the reaction force applied to the pedal 50 by the reaction force generating mechanism 60. In other words, the elastic member 75 is provided in parallel with the reaction force generating mechanism 60. The elastic member 75 of the present embodiment functions as the pedal restoring unit 70 of the first embodiment.

According to the configuration described above, even when the pedal 50 cannot be restored back to the reference position by the reaction force of the reaction force generating mechanism 60 due to a failure of the reaction force generating mechanism 60, the elastic member 75 can move the position of the pedal 50 closer to the reference position.

Further, according to the embodiment described above, it is possible to achieve the following advantageous effects.

(1) In the embodiment described above, the elastic member 75 is attached to the pedal 50. According to the above, compared to a configuration in which the elastic member 75 is not attached to the pedal 50, a degree of freedom in an arrangement position of the elastic member 75 is improvable. For example, in the present embodiment, an example has been described in which the elastic member 75 is attached to the pedal 50 via the rotating plate 20. However, the elastic member 75 may also be attached directly to the pedal 50 without using the rotating plate 20.

Other Embodiments

Although the representative embodiments of the present disclosure have been described above, the present disclosure is not limited to the embodiments and can be variously modified as follows, for example.

In the embodiments described above, an example is described in which the reaction force generating mechanism 60 applies a reaction force to the pedal 50 that is greater than the restoring force that the pedal restoring unit 70 applies to the pedal 50 when the pedal 50 changes its position from the reference position in the first circumferential direction Dy1. However, the present disclosure is not limited to such an example. For example, a reaction force generating mechanism 60 may be configured to apply a reaction force to a pedal 50, which is smaller than the restoring force that a pedal restoring unit 70 applies to a pedal 50 when the pedal 50 changes its position from the reference position in the first circumferential direction Dy1.

In the embodiments described above, an example has been described in which the first ECU 951 and the second ECU 952 detect a failure of the reaction force generating mechanism 60 based on information on the rotational position of the pedal 50 detected by the sensor unit 40. However, the present disclosure is not limited to such an example. For example, a pedal device 1 may include a processing device that functions as a failure detection unit, and the processing device may detect a failure of a reaction force generating mechanism 60 based on information about the rotational position of the pedal 50 detected by a sensor unit 40.

In the embodiments described above, a configuration has been described in which the pedal device 1 includes the sensor unit 40 that detects the rotation angle of the pedal 50.

However, the present disclosure is not limited to such an example. For example, a pedal device 1 may be configured without the sensor unit 40.

In the embodiments described above, the first ECU 951 and the second ECU 952 determine that the reaction force generating mechanism 60 is in failure when the pedal 50 is not positioned at the reference position and the accelerator opening degree is greater than 0. Although such an example has been described, the present disclosure is not limited thereto. For example, a first ECU 951 and a second ECU 952 may be configured to be capable of detecting whether an ignition switch of the vehicle is turned on or off. In such case, the first ECU 951 and the second ECU 952 may determine that a reaction force generating mechanism 60 is in failure when a pedal 50 is not positioned at the reference position and the ignition switch is turned off.

In the first and second embodiments described above, an example has been described in which it is incapable for the pedal 50 to be restored back to the reference position by the restoring force generated from the pedal restoring unit 70. However, the present disclosure is not limited to such an example. For example, a pedal restoring unit 70 may be configured to be capable of applying, to the pedal 50, a restoring force that can restore the pedal 50 back to the reference position.

In the first and second embodiments described above, the pedal restoring unit 70 is composed of a coil spring. Further, an example has been described in which the pedal restoring unit 70 generates a restoring force that rotates the pedal 50 in the second circumferential direction Dy2 by being twisted and elastically deformed when the guide unit 32 rotates in the first circumferential direction Dy1. However, the present disclosure is not limited thereto. For example, a pedal restoring unit 70 may be a member that is elastically deformable and is different from a coil spring, and is compressed and elastically deformed when a guide unit 32 rotates in the first circumferential direction Dy1, thereby generating a restoring force for rotating a pedal 50 in the second circumference direction Dy2.

In the first and second embodiments described above, an example has been described in which the rotating member 30 includes the shaft 31 that rotates about the rotation axis CL, and the guide unit 32 that is attached to the shaft 31 and transmits the rotational force of the shaft 31 to the pedal restoring unit 70. However, the present disclosure is not limited thereto. For example, a rotating member 30 may be configured without the guide unit 32. In such case, by configuring a shape of a shaft 31 so that the rotational force of the shaft 31 is transmittable to a pedal restoring unit 70, the driver's stepping force applied to a pedal 50 is transmittable to the pedal restoring unit 70.

In the embodiments described above, an example has been described in which the pedal device 1 is configured as an organ-type pedal device 1. However, the present disclosure is not limited thereto. For example, a pedal device 1 may be implemented as a pendant-type pedal device 1. Note that the pendant-type pedal device 1 refers to one in which a portion of a pedal 50 that is stepped on by the driver is arranged on a lower side of the vehicle in the vehicle vertical direction Db with respect to the rotation axis CL.

In the embodiments described above, an example has been described in which the pedal device 1 is operated by the driver's stepping operation, but the pedal device 1 is not limited to such an example. For example, a pedal device 1 may be configured to be operated by the driver's hand.

In the embodiments described above, it is needless to say that the elements configuring the embodiments are not necessarily essential except in case where those elements are clearly indicated to be essential in particular, in case where those elements are considered to be obviously essential in principle, or the like.

In the embodiments described above, the present disclosure is not limited to a specific number, numerical values, quantities, ranges, and the like regarding the configuration element, except when specificity of the above is expressly indispensable, when specificity of the above is obviously limited thereto in principle, or the like.

In the embodiments described above, when referring to the shape, positional relationship, and the like of a configuration element and the like, it is not limited to such shape, positional relationship, and the like, except for the case where it is specifically indicated, the case where it is fundamentally limited to a specific shape, positional relationship, or the like.

What is claimed is:

1. A pedal device comprising:
   a housing;
   a pedal attached to the housing in a posture changeable from a reference position in a first direction by a braking operation of a driver, and changeable in a second direction opposite to the first direction when the braking operation is released;
   a reaction force generating unit including a spring that is at least partially housed in the housing, the reaction force generating unit being configured to apply a reaction force to the pedal against a load given by the braking operation due to elastic deformation when the posture of the pedal changes from the reference position in the first direction by the braking operation, and to restore a position of the pedal to the reference position by the reaction force when the braking operation is released; and
   a pedal restoring unit provided in parallel with the reaction force generating unit, and configured to be elastically deformed according to a change amount in the posture of the pedal, and to apply a restoring force to the pedal to bring the position of the pedal closer to the reference position by changing the posture of the pedal in the second direction when the braking operation is released,
   wherein the reaction force generating unit is configured to apply the reaction force to the pedal, which is greater than the restoring force applied to the pedal by the pedal restoring unit, when a posture of the pedal changes from the reference position in the first direction.

2. The pedal device according to claim 1, further comprising:
   a pedal detection unit configured to detect information in connection with a posture of the pedal, wherein
   the pedal restoring unit is configured to be incapable of restoring the pedal to the reference position by the restoring force applied to the pedal, when the reaction force generating unit is in failure, and
   the pedal detection unit detects information in connection with the posture of the pedal in a state where the pedal is not positioned at the reference position, when the reaction force generating unit is in failure.

3. The pedal device according to claim 2, wherein
   the pedal restoring unit generates the restoring force in accordance with a change amount when a posture of the pedal changes from the reference position in the first direction by the change amount greater than a predetermined change amount which is greater than 0.

4. The pedal device according to claim 3, wherein the pedal restoring unit is configured not to generate the restoring force when the change amount is less than the predetermined change amount.

5. The pedal device according to claim 2, wherein the pedal is attached to the housing to have a posture that is changeable in the first direction by an own weight of the pedal, and the pedal restoring unit is set to have the restoring force that is generated when the posture of the pedal changes from the reference position in the first direction within a range smaller than a predetermined change amount, and that is set to be smaller than a load applied to the pedal due to the own weight of the pedal.

6. The pedal device according to claim 1, wherein the pedal restoring unit is set to have the restoring force generated in accordance with the change amount in the posture of the pedal is set to be equal to or greater than a load required for restoring the posture of the pedal to the reference position.

7. The pedal device according to claim 1, wherein the pedal restoring unit is attached to the pedal.

8. The pedal device according to claim 7, wherein the pedal restoring unit is disposed between the pedal and an outer surface of the housing.

9. The pedal device according to claim 1, wherein the pedal restoring unit is housed in the housing.

10. The pedal device according to claim 9, wherein the pedal restoring unit is housed inside the reaction force generating unit in a compressed state.

11. The pedal device according to claim 1, further comprising:

a pedal detection unit configured to detect information in connection with a posture of the pedal, wherein the pedal restoring unit is configured not to restore the pedal to the reference position by the restoring force applied to the pedal, when the reaction force generating unit is in failure, and the pedal detection unit detects information in connection with the posture of the pedal in a state where the pedal is not positioned at the reference position, when the reaction force generating unit is in failure.

12. The pedal device according to claim 1, wherein the spring of the reaction force generating unit includes a leaf spring.

13. The pedal device according to claim 1, wherein the spring of the reaction force generating unit includes a first coil spring and a second diameter coil spring, wherein a first diameter of the first coil spring is larger than a second diameter of the second coil spring.

14. The pedal device according to claim 1, wherein the spring of the reaction force generating unit includes a leaf spring, a first coil spring and a second diameter coil spring, wherein a first diameter of the first coil spring is larger than a second diameter of the second coil spring.

15. A pedal device comprising:

a housing;

a pedal attached to the housing in a posture changeable from a reference position in a first direction by a braking operation of a driver, and changeable in a second direction opposite to the first direction when the braking operation is released;

a reaction force generating unit configured to apply a reaction force to the pedal against a load given by the braking operation due to elastic deformation when the posture of the pedal changes from the reference position in the first direction by the braking operation, and to restore a position of the pedal to the reference position by the reaction force when the braking operation is released;

a pedal restoring unit provided in parallel with the reaction force generating unit, and configured to be elastically deformed according to a change amount in the posture of the pedal, and to apply a restoring force to the pedal to bring the position of the pedal closer to the reference position by changing the posture of the pedal in the second direction when the braking operation is released; and a rotating member rotatable about a predetermined rotation axis together with the pedal by the braking operation, wherein the reaction force generating unit is configured to apply the reaction force to the pedal, which is greater than the restoring force applied to the pedal by the pedal restoring unit, when a posture of the pedal changes from the reference position in the first direction, the posture of the pedal is changeable in the first direction and in the second direction by rotating together with the rotating member, and the pedal restoring unit is provided at the rotating member to be elastically deformable by a rotational force when the rotating member rotates in the first direction, and is configured to generate the restoring force that causes the pedal to be rotated in the second direction by the elastic force generated when the rotating member rotates in the first direction.

16. The pedal device according to claim 15, wherein the pedal restoring unit is a coil spring wound around the rotating member, and is configured to generate the restoring force causing the pedal to be rotated in the second direction by being twisted and elastically deformed when the rotating member rotates in the first direction.

17. The pedal device according to claim 16, wherein the rotating member includes:

a shaft that rotates about the predetermined rotation axis; and a guide unit that is attached to the shaft to transmit the rotational force of the shaft to the pedal restoring unit.

* * * * *